(12) United States Patent
Kanda

(10) Patent No.: US 10,619,072 B2
(45) Date of Patent: Apr. 14, 2020

(54) URETHANE RESIN PARTICLES

(71) Applicant: KANSAI PAINT CO., LTD., Hyogo (JP)

(72) Inventor: Takashi Kanda, Kanagawa (JP)

(73) Assignee: KANSAI PAINT CO., LTD., Kyogo (JP)

( * ) Notice: Subject to any disclaimer, the term of this patent is extended or adjusted under 35 U.S.C. 154(b) by 88 days.

(21) Appl. No.: 15/750,877

(22) PCT Filed: Jul. 26, 2016

(86) PCT No.: PCT/JP2016/071885
§ 371 (c)(1),
(2) Date: Feb. 7, 2018

(87) PCT Pub. No.: WO2017/038306
PCT Pub. Date: Mar. 9, 2017

(65) Prior Publication Data
US 2018/0230327 A1  Aug. 16, 2018

(30) Foreign Application Priority Data

Sep. 1, 2015 (JP) ................................ 2015-171713
Nov. 9, 2015 (JP) ................................ 2015-219582

(51) Int. Cl.
| | | |
|---|---|---|
| C08G 18/44 | (2006.01) | |
| C08G 18/48 | (2006.01) | |
| C09D 175/04 | (2006.01) | |
| C09D 5/02 | (2006.01) | |
| C09D 201/00 | (2006.01) | |
| C08G 18/66 | (2006.01) | |
| C08G 18/75 | (2006.01) | |
| C08G 18/38 | (2006.01) | |
| C08G 18/40 | (2006.01) | |
| C08G 18/62 | (2006.01) | |
| C09D 175/08 | (2006.01) | |
| C09D 175/06 | (2006.01) | |
| C08G 18/42 | (2006.01) | |
| C08G 18/32 | (2006.01) | |
| C08G 18/34 | (2006.01) | |
| C08G 18/10 | (2006.01) | |
| C08G 18/73 | (2006.01) | |

(Continued)

(52) U.S. Cl.
CPC ....... *C09D 175/04* (2013.01); *C08G 18/0823* (2013.01); *C08G 18/0828* (2013.01); *C08G 18/10* (2013.01); *C08G 18/12* (2013.01); *C08G 18/3206* (2013.01); *C08G 18/3228* (2013.01); *C08G 18/348* (2013.01); *C08G 18/3857* (2013.01); *C08G 18/4018* (2013.01); *C08G 18/4063* (2013.01); *C08G 18/4216* (2013.01); *C08G 18/44* (2013.01); *C08G 18/4854* (2013.01); *C08G 18/6229* (2013.01); *C08G 18/6659* (2013.01); *C08G 18/6677* (2013.01); *C08G 18/6692* (2013.01); *C08G 18/73* (2013.01); *C08G 18/755* (2013.01); *C08G 18/8077* (2013.01); *C08J 3/126* (2013.01); *C09D 5/02* (2013.01); *C09D 175/06* (2013.01); *C09D 175/08* (2013.01); *C09D 201/00* (2013.01); *C08J 2375/04* (2013.01)

(58) Field of Classification Search
CPC .......... C08G 18/0823; C08G 18/0828; C08G 18/10; C08G 18/12; C08G 18/3206; C08G 18/3228; C08G 18/348; C08G 18/3857; C08G 18/4018; C08G 18/4063; C08G 18/4216; C08G 18/44; C08G 18/4854; C08G 18/6229; C08G 18/6659; C08G 18/6677; C08G 18/6692; C08G 18/73; C08G 18/755; C08G 18/8077; C08J 3/126; C08J 2375/04; C09D 175/04; C09D 175/06; C09D 175/08; C09D 201/00; C09D 5/02
See application file for complete search history.

(56) References Cited

U.S. PATENT DOCUMENTS

| | | | | |
|---|---|---|---|---|
| 5,959,003 | A | * | 9/1999 | Lo .......................... C08G 18/12 523/201 |
| 6,017,998 | A | | 1/2000 | Duan et al. |

(Continued)

FOREIGN PATENT DOCUMENTS

| | | |
|---|---|---|
| JP | 6-263834 | 9/1994 |
| JP | 8-12736 | 1/1996 |

(Continued)

OTHER PUBLICATIONS

International Search Report dated Sep. 6, 2016 in International (PCT) Application No. PCT/JP2016/071885.

*Primary Examiner* — Irina S Zemel
*Assistant Examiner* — Jeffrey S Lenihan
(74) *Attorney, Agent, or Firm* — Wenderoth, Lind & Ponack, L.L.P.

(57) ABSTRACT

The problem to be solved by the present invention is to provide urethane resin particles that, when used as a component of a coating composition, enable the resulting coating composition to have excellent storage stability and excellent degree of freedom of adjustment of physical properties of the obtained coating film. The present invention provides core-shell type urethane resin particles having a core-shell structure in which the core comprises a urethane resin obtained by using a polyol component comprising polyether polyol, whereas the shell comprises a urethane resin obtained by using a polyol component comprising polycarbonate polyol.

9 Claims, 1 Drawing Sheet

(51) Int. Cl.
*C08G 18/08* (2006.01)
*C08J 3/12* (2006.01)
*C08G 18/80* (2006.01)
*C08G 18/12* (2006.01)

(56) References Cited

U.S. PATENT DOCUMENTS

2010/0184914 A1 7/2010 Jono et al.
2011/0112245 A1 5/2011 Nakamura et al.

FOREIGN PATENT DOCUMENTS

| | | |
|---|---|---|
| JP | 2006-96893 | 4/2006 |
| JP | 2010-47752 | 3/2010 |
| WO | 2008/020492 | 2/2008 |
| WO | 2010/004951 | 1/2010 |

* cited by examiner

TEM observation

Comparative Example 1

Example 1

URETHANE RESIN PARTICLES

CROSS-REFERENCE TO RELATED APPLICATIONS

This application claims priority to Japanese Patent Application No. 2015-171713 filed on Sep. 1, 2015, and Japanese Patent Application No. 2015-219582 filed on Nov. 9, 2015 (the entire contents of which are incorporated herein by reference).

TECHNICAL FIELD

The present invention relates to urethane resin particles that, when used as a component for a coating composition, can provide a coating composition having excellent storage stability and capable of forming a coating film with excellent physical properties and excellent finished appearance. The present invention further relates to a coating composition comprising the urethane resin particles.

BACKGROUND ART

Urethane resin particles, which have excellent physical properties, have been widely used as resin particles for use in coating compositions, for example, to improve coating film performance.

To obtain desired physical properties, a great deal of research has been conducted on polyol used as a constituent material for a urethane resin composition.

More specifically, it has heretofore been common that a polycarbonate polyol or polyester polyol with a high Tg is used to obtain high toughness, and a polyether polyol with a low Tg is used to obtain high flexibility. Further, many attempts have also been made to optimize physical properties by using a combination of two or more of such polyols.

However, when urethane resin particles are synthesized by using a polyether polyol in order to obtain high flexibility, the obtained urethane resin particles have poor resistance to solvents in coating compositions, presumably due to low cohesion of the polyether polyol. When such urethane resin particles are used to produce a coating composition or the like, the resulting coating composition disadvantageously has significantly poor storage stability. Even if a polycarbonate polyol having a higher cohesion was tentatively used concurrently to overcome this deficiency, a small amount of polycarbonate polyol fails to improve storage stability, whereas an excessively large amount of polycarbonate polyol fails to obtain desired flexibility.

For example, Patent Literature (PTL) 1 discloses an aqueous polyurethane resin dispersion comprising a urethane resin produced by using as a polyol component a polyol compound comprising a polycarbonate polyol having an alicyclic structure.

However, when the urethane resin disclosed in PTL 1 is incorporated into a coating composition or the like, it may be difficult to impart flexibility to the resulting coating film.

Patent Literature (PTL) 2 discloses a polyurethane resin emulsion produced by using, as essential components, at least one polyisocyanate selected from the group consisting of specific diisocyanate compounds, and a polyol that is either a polycarbonate polyol or polyether polyol, the polyurethane resin emulsion having a functional group concentration within a specific wt. % range, based on the weight of the polyurethane resin.

However, the polyurethane resin disclosed in PTL 2 may have insufficient storage stability when used in a coating composition or the like. Accordingly, it may be difficult to obtain both sufficient storage stability and desired physical properties of the resulting coating film.

CITATION LIST

Patent Literature

PTL 1: WO2010/004951
PTL 2: JP2006-096893A

SUMMARY OF INVENTION

Technical Problem

An object of the present invention is to provide urethane resin particles that, when used as a component for a coating composition, can provide a coating composition having excellent storage stability and an excellent degree of freedom of adjustment of physical properties of the resulting coating film, and capable of forming a coating film with excellent finished appearance. Another object of the present invention is to provide a coating composition comprising the urethane resin particles.

Solution to Problem

The present inventors conducted extensive research. As a result, the inventors found that the above object can be achieved by forming urethane resin particles having a core-shell structure in which the core comprises a urethane resin obtained by using a polyol component comprising polyether polyol, and the shell comprises a urethane resin obtained by using a polyol component comprising polycarbonate polyol. The present invention has been accomplished based on this finding.

Specifically, the present invention provides core-shell type urethane resin particles having a core-shell structure in which the core comprises a urethane resin obtained by using a polyol component comprising polyether polyol, whereas the shell comprises a urethane resin obtained by using a polyol component comprising polycarbonate polyol.

The present invention further provides a coating composition comprising the core-shell type urethane resin particles.

The present invention further provides a method for producing the core-shell type urethane resin particles, and a method for producing a coating composition comprising the core-shell type urethane resin particles.

Advantageous Effects of Invention

The main characteristic of the urethane resin particles of the present invention is that the urethane resin particles have a core-shell structure in which the core comprises a urethane resin obtained by using a polyol component comprising polyether polyol, whereas the shell comprises a urethane resin obtained by using a polyol component comprising polycarbonate polyol.

Urethane resins whose compositions are different in polyol component are formed into a resin particle having a core-shell structure, whereby the properties characteristic of each urethane resin based on the composition can be effectively exhibited. Accordingly, urethane resin particles can be provided that, when used as a constituent component of a coating composition, can provide a coating composition with excellent storage stability and an excellent degree of freedom of adjustment of physical properties of the resulting coating film.

More specifically, a polyurethane resin obtained by using a polyol component comprising polyether polyol has poor resistance to solvents due to its low cohesion; thus, when used as a component for a coating composition, the resulting resin composition exhibits poor storage stability, but can impart flexibility to the obtained coating film. Since the urethane resin particles of the present invention have a core-shell structure in which the core comprises a polyurethane resin obtained by using a polyether polyol, and the shell comprises a polyurethane resin obtained by using a polycarbonate polyol having high cohesion, the polyurethane resin obtained by using a polyether polyol having low cohesion can be included in a polyurethane resin obtained by using a polycarbonate polyol having high cohesion, whereby solvent resistance of the obtained resin particles can be enhanced, so that when the urethane resin particles are used as a component for a resin coating composition, the coating composition can have enhanced storage stability.

Thus, when the urethane resin particles of the present invention are used, the obtained coating composition has excellent storage stability and can provide a coating film with excellent flexibility, and has an excellent degree of freedom of adjustment of physical properties of the resulting coating film.

According to one embodiment of the present invention, an aqueous coating composition, which further comprises, in addition to the core-shell type urethane resin particles, a reactive group-containing resin (B) and optionally comprises a crosslinking agent (C), can provide a coating film with excellent finished appearance, in addition to the effects described above.

DESCRIPTION OF EMBODIMENTS

Figure 1:
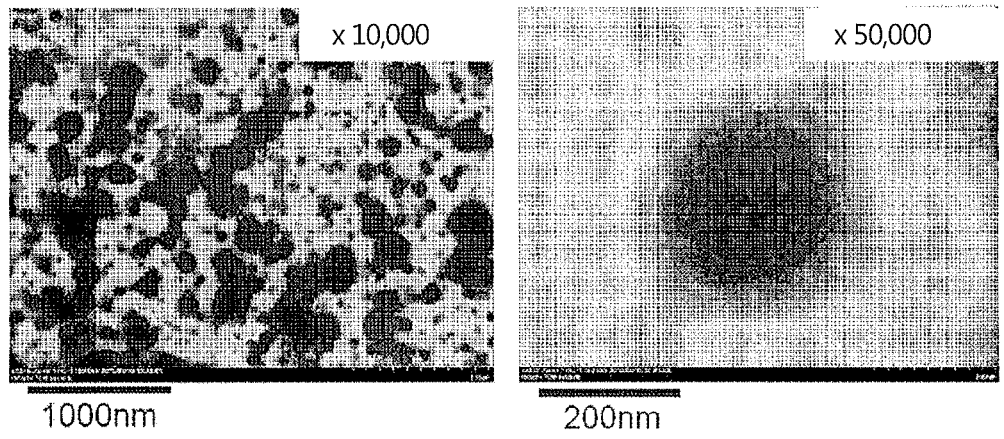
FIG. 1 shows TEM images of the urethane resin particles obtained in Example 1A and Comparative Example 1A. The aqueous dispersion of urethane resin particles No. 19A obtained in Comparative Example 1A was very unstable as particles, and a core-shell structure was not observed. In contrast, the aqueous dispersion of urethane resin particles No. 1A obtained in Example 1A was in the form of stable particles, and a clear core-shell structure was observed.
Figure 1:
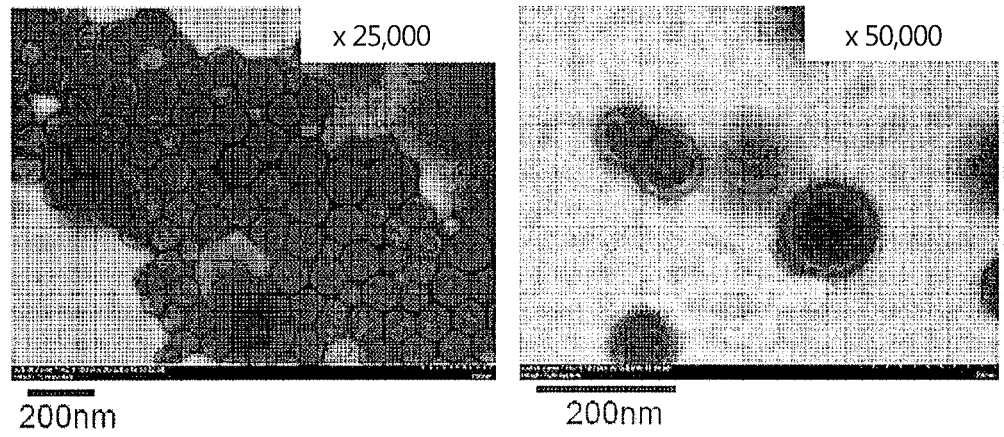

The urethane resin particles and the coating composition of the present invention are described below in more detail.

The urethane resin particles of the present invention (hereinafter sometimes briefly referred to as "the resin particles of the present invention") are urethane resin particles having a core-shell structure in which the core comprises a urethane resin obtained by using a polyol component comprising polyether polyol, whereas the shell comprises a urethane resin obtained by using a polyol component comprising polycarbonate polyol.

Urethane Resin Particles

The urethane resin particles of the present invention are usually synthesized as a dispersion in an aqueous solvent. The form of the urethane resin particles is not particularly limited as long as the particles are dispersed in an aqueous solvent. The urethane resin particles are preferably dispersed in water as particles having a structure such that a urethane resin (II), which forms the shell of the urethane resin particles, is disposed around a urethane resin (I), which forms the core of the urethane resin particles, so as to stabilize the dispersion. In other words, the urethane resin particles are preferably dispersed in the form of a core-shell structure such that the urethane resin (II) is disposed outside and the urethane resin (I) is disposed inside. The urethane resin particles are considered to practically substantially have such a particle form. The aqueous solvent refers to a solvent comprising water as a main component (e.g., a solvent containing 90 to 100 mass % of water). In the present invention, the aqueous solvent may further comprise a solvent usually used with an aqueous solvent in the technical field to which the present invention pertains (e.g., N-methyl-2-pyrrolidone, ethylene glycol monomethyl ether, etc.).

More specifically, the core shell structure refers to a structure in which components of different resin compositions are present in the same particle and the resin composition of the central portion (core) is different from that of the outer shell portion (shell).

The core-shell type multilayer structure generally takes a layered structure such that the core portion is completely covered by the shell portion. However, depending on the mass ratio of the core portion to shell portion or other conditions, the shell portion may be insufficient for forming a layered structure. In that case, a complete layered structure as described above is not necessary. A structure in which the shell portion partially covers the core portion may be selected.

The ratio of the urethane resin (I), which forms the core portion of the urethane resin particles, to the urethane resin (II), which forms the shell portion of the urethane resin particles, is preferably within the range of from 20:80 to 95:5 (mass ratio), more preferably from 40:60 to 90:10, and even more preferably from 60:40 to 80:20.

When the ratio of the urethane resin (I) is less than 20 mass % and when a polyether polyol is used to impart desired physical properties, such as flexibility, to a coating film of a coating composition obtained by using the urethane resin particles, the coating film as a whole may fail to exhibit sufficient flexibility.

On the other hand, when the ratio of the urethane resin (I) is more than 95 mass %, a sufficient storage stability effect may not be achieved by the urethane resin (II), which forms the shell portion.

The urethane resin particles of the present invention can be synthesized by using, in general, a polyol and a polyisocyanate compound, and optionally further using a compound containing both an active hydrogen group and an ion-forming group, as starting materials for urethane resin.

The urethane resin particles of the present invention are core-shell type urethane resin particles that have a core-shell structure such that a urethane resin (I) is disposed inside and a urethane resin (II) is disposed outside and that are in the form of a dispersion in an aqueous solvent.

Known methods for producing urethane resin particles can be used, as long as the urethane resin particles can be formed into a core-shell structure. In view of production stability (dispersion stability of the obtained resin particles), the urethane resin particles are preferably produced by the following method (comprising steps 1 to 3 described below).

1. First, a hydroxy-terminated urethane resin (II) containing an ion-forming group is synthesized by using a polycarbonate polyol as an essential starting material (synthesis of a polycarbonate segment).

2. Subsequently, starting materials for urethane resin (I), which comprise a polyether polyol as an essential starting material, are added to synthesize an isocyanate-terminated prepolymer in which the urethane resin (I) is grafted to the urethane resin (II) (grafting of a polyether segment and synthesis of a prepolymer).

3. The obtained prepolymer is emulsified, and optionally further subjected to a chain extension reaction and solvent removal to obtain a core-shell type urethane resin particle of the present invention.

Thus, the present invention provides a method for producing core-shell type urethane resin particles, comprising the steps of: reacting a monomer mixture comprising a polyol comprising polycarbonate polyol, and a polyisocyanate compound to obtain a urethane resin (II); and reacting a monomer mixture comprising a polyol comprising polyether polyol, and a polyisocyanate compound in the presence of the urethane resin (II) to synthesize a urethane resin (I), wherein the urethane resin (I) forms the core of the urethane resin particles and the urethane resin (II) forms the shell of the urethane resin particles.

The production methods are described below more specifically, and the urethane resin particles of the present invention are also described in more detail. However, it should be understood that the urethane resin particles of the present invention are not limited to those obtained by the production methods described below.

Synthesis of Urethane Resin (II)

The urethane resin (II) forms the shell of the urethane resin particles of the present invention. The urethane resin (II) can be synthesized by using a polyol comprising polycarbonate polyol as an essential component and a polyisocyanate compound, and optionally further using a compound containing both an active hydrogen group and an ion-forming group as a water-dispersing group-providing component.

Examples of polyols include polycarbonate polyols (polycarbonate diols and trihydric or higher polyhydric polycarbonate polyols), which are used as an essential component; and polyols other than polycarbonate polyols [for example, diol compounds, polyether polyols (polyether diols and trihydric or higher polyhydric polyether polyols), polyester polyols (polyester diols and trihydric or higher polyhydric polyester polyols), polyether ester polyols (polyether ester diols and trihydric or higher polyhydric polyether ester polyols), etc.]. Diols are preferable in view of manufacturability.

These polyols can be used singly, or in a combination of two or more.

Preferable examples of polycarbonate diols, diol compounds, polyether diols, polyester diols, and polyether ester diols that can be used as starting materials for urethane resin (II) in the present invention include the following.

Polycarbonate diols: for example, compounds represented by HO—R—(O—C(O)—O—R)x-OH (wherein R is $C_{1-12}$ alkylene or $C_{1-3}$ alkylene-$C_{3-8}$ cycloalkylene-$C_{1-3}$ alkylene, and x is the number of repeating units of the molecule and is usually an integer of 5 to 50; and each R may be the same or different). These compounds can be obtained, for example, by a transesterification method in which a diol is reacted with a substituted carbonate (e.g., diethyl carbonate, diphenyl carbonate, or the like) under conditions such that hydroxy groups are present in excess; or a method in which the saturated aliphatic diol described above is reacted with a phosgene, or the reaction product is then further reacted, if necessary, with the saturated aliphatic diol. The $C_{1-12}$ alkylene group (saturated aliphatic diol residue) represented by R may be, for example, a $C_{1-12}$ linear or branched (preferably linear) alkylene group. Examples include —$CH_2$—, —$(CH_2)_2$—, —$(CH_2)_3$—, —$(CH_2)_4$—, —$CH_2$—CH($CH_3$)—$CH_2$—, —$(CH_2)_5$—, —$CH_2$—CH($C_2H_5$)—$CH_2$—, —$(CH_2)_6$—, —$(CH_2)_7$—, —$(CH_2)_8$—, —$(CH_2)_9$—, —$(CH_2)_{10}$—, —$(CH_2)_{11}$—, —$(CH_2)_{12}$—, and the like. The $C_{1-3}$ alkylene group contained in the "$C_{1-3}$ alkylene-$C_{3-8}$ cycloalkylene-$C_{1-3}$ alkylene group" represented by R is a $C_{1-3}$ (preferably $C_1$) linear or branched (preferably linear) alkylene group. Examples include methylene, ethylene, and propylene (n-propylene and isopropylene) groups. The two "$C_{1-3}$ alkylene" groups contained in the "$C_{1-3}$ alkylene-$C_{3-8}$ cycloalkylene-$C_{1-3}$ alkylene group" may be the same or different (and are preferably the same). The $C_{3-8}$ cycloalkylene group contained in the "$C_{1-3}$ alkylene-$C_{3-8}$ cycloalkylene-$C_{1-3}$ alkylene group" is a divalent hydrocarbon group obtained by removing two hydrogen atoms from a $C_{3-8}$ (preferably $C_{5-7}$, more preferably $C_6$) cycloalkane. Examples include 1,1-cyclopropylene, 1,2-cyclopropylene, 1,1-cyclobutylene, 1,2-cyclobutylene, 1,3-cyclobutylene, 1,2-cyclopentylene, 1,3-cyclopentylene, 1,1-cyclohexylene, 1,2-cyclohexylene, 1,3-cyclohexylene, 1,4-cyclohexylene, 1,3-cycloheptylene, 1,4-cyclooctylene, and the like. The $C_{1-3}$ alkylene-$C_{3-8}$ cycloalkylene-$C_{1-3}$ alkylene group may be, for example, a divalent substituent in which a $C_{1-3}$ alkylene group as mentioned above, a $C_{3-8}$ cycloalkylene group as mentioned above, and a $C_{1-3}$ alkylene group as mentioned above are bonded in this order. Specific examples thereof include methylene-1,2-cyclopropylene-methylene, methylene-1,2-cyclopropylene-ethylene, ethylene-1,2-cyclopropylene-ethylene, methylene-1,3-cyclobutylene-methylene, methylene-1,3-cyclopentylene-methylene, methylene-1,1-cyclohexylene-methylene, methylene-1,3-cyclohexylene-methylene, methylene-1,4-cyclohexylene-methylene, ethylene-1,4-cyclohexylene-ethylene, methylene-1,4-cyclohexylene-ethylene, propylene-1,4-cyclohexylene-propylene, methylene-1,3-cycloheptylene-methylene, methylene-1,4-cyclooctylene-methylene, and the like. Methylene-1,4-cyclohexylene-methylene is preferable.

In view of manufacturability and physical properties of the coating film of a coating composition obtained by using the urethane resin particles, R in the polycarbonate diol is preferably a saturated aliphatic diol residue having 1 to 12 carbon atoms (preferably 4 to 10 carbon atoms). In view of manufacturability, the polycarbonate diol preferably has a number average molecular weight of 500 to 10000, particularly preferably 500 to 5000, and more particularly preferably 500 to 3000. These polycarbonate diols can be used singly, or in a combination of two or more.

Diol compounds: ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecane dimethanol, 1,4-cyclohexane dimethanol, and the like. These diol compounds can be used singly, or in a combination of two or more.

Polyether diols: alkylene oxide addition products of the diol compounds described above, ring-opening (co)polymers of alkylene oxides or cyclic ethers (e.g., tetrahydrofuran), such as polyethylene glycol, polypropylene glycol, (blocked or random) copolymers of ethylene glycol and propylene glycol, glycol, polytetramethylene glycol, polyhexamethylene glycol, polyoctamethylene glycol, and the like. These polyether diols can be used singly, or in a combination of two or more.

Polyester diols: compounds obtained by polycondensing dicarboxylic acids (or dicarboxylic acid anhydrides), such as adipic acid, succinic acid, sebacic acid, glutaric acid, maleic acid, fumaric acid, and phthalic acid, with diol compounds as described above, such as ethylene glycol, propylene glycol, 1,4-butanediol, 1,6-hexanediol, 1,8-octamethylenediol, and neopentyl glycol, under conditions such that hydroxy groups are present in excess. Specific examples thereof include ethylene glycol-adipic acid condensation products, butanediol-adipic acid condensation products, hexamethylene glycol-adipic acid condensation products, ethylene glycol-propylene glycol-adipic acid condensation products, polylactonediols obtained by subjecting lactone to ring-opening polymerization using glycol as an initiator, and the like. These polyesterdiols can be used singly, or in a combination of two or more.

Polyether ester diols: compounds obtained by adding ether group-containing diols (e.g., the polyether diol and diethylene glycol mentioned above) or mixtures thereof with other glycols to dicarboxylic acids (or dicarboxylic acid anhydrides) as described above as examples of polyester diols and then reacting alkylene oxides therewith, such as polytetramethylene glycol-adipic acid condensation products. These polyether ester diols can be used singly, or in a combination of two or more.

In view of solvent resistance of the obtained urethane resin particles and storage stability of the coating composition obtained by using the urethane resin particles, a polycarbonate polyol is preferably present in an amount of 5 to 100 mass %, particularly preferably 10 to 100 mass %, and more particularly preferably 20 to 100 mass %, based on the total amount of the polyol component of the urethane resin (II).

Examples of polyisocyanate compounds include isophorone diisocyanate (IPDI), 2,4-tolylene diisocyanate (2,4-TDI), a mixture of 2,4-tolylene diisocyanate (2,4-TDI) with 2,6-tolylene diisocyanate (2,6-TDI), 4,4'-diphenylmethane diisocyanate, 1,4-phenylene diisocyanate, 1,5-naphthalene diisocyanate, hexamethylene diisocyanate (HMDI), trimethylhexamethylene diisocyanate, cyclohexane-1,4-diisocyanate, 4,4'-dicyclohexylmethane diisocyanate (hydrogenated MDI), xylylene diisocyanate, tetramethylxylylene diisocyanate, and the like.

If necessary, trimers of TDI, HMDI, IPDI, etc., described above; or trivalent polyisocyanates, which are reactants with trimethylolpropane or the like, can also be used.

In view of yellowing resistance of the coating film of a coating composition obtained by using the urethane resin particles, the polyisocyanate compound is preferably a polyisocyanate compound having a saturated aliphatic structure or a saturated alicyclic structure. Specific examples of polyisocyanate compounds having a saturated aliphatic structure include hexamethylene diisocyanate (HMDI) and the like. Specific examples of polyisocyanate compounds having a saturated alicyclic structure include isophorone diisocyanate (IPDI), 4,4'-dicyclohexylmethane diisocyanate (hydrogenated MDI), and the like.

In view of physical properties of the coating film of a coating composition obtained by using the urethane resin particles, the polyisocyanate compound preferably has a number average molecular weight of 100 to 2000, particularly preferably 100 to 1000, and more particularly preferably 100 to 500. These polyisocyanate compounds can be used singly, or in a combination of two or more.

Examples of compounds containing both an active hydrogen group and an ion-forming group include compounds containing at least two hydroxy groups and at least one carboxy group per molecule; compounds containing at least two hydroxy groups and at least one sulfonic acid group per molecule; and the like. These compounds act as an ion-forming group in the urethane resin. In view of the dispersion stability of the urethane resin particles, these compounds can be preferably used. In view of flexibility of the obtained coating film, compounds having at least two hydroxy groups and at least one carboxy group per molecule are preferable.

Examples of carboxy-containing compounds include alkanolcarboxylic acid compounds, such as dimethylolpropionic acid, dimethylolacetic acid, dimethylolbutanoic acid, dimethylolheptanoic acid, dimethylolnonanoic acid, 1-carboxy-1,5-pentylenediamine, dihydroxybenzoic acid, and 3,5-diaminobenzoic acid; half-ester compounds of polyoxypropylene triol with maleic anhydride and/or phthalic anhydride; and the like.

Examples of sulfonic acid group-containing compounds include 2-sulfonic acid-1,4-butanediol, 5-sulfonic acid-di-β-hydroxyethyl isophthalate, N,N-bis(2-hydroxyethyl)aminoethylsulfonic acid, and the like. These compounds containing both an active hydrogen group and an ion-forming group can be used singly, or in a combination of two or more.

When a compound containing both an active hydrogen group and an ion-forming group is used, the amount of the compound used is preferably within the range of 2 to 40 mass %, particularly preferably 3 to 30 mass %, and more particularly preferably 5 to 20 mass %, based on the total amount of the compounds that constitute the urethane resin (II), in view of aqueous dispersion stability, and water resistance of the coating film of a coating composition obtained by using the urethane resin particles.

When a carboxy- or sulfonic acid group-containing compound is used as the compound containing both an active hydrogen group and an ion-forming group, a neutralizing agent can be used to form a salt and hydrophilize the compound. Examples of neutralizing agents that can be used include amine compounds, such as trimethylamine, triethylamine, monoethanolamine, diethanolamine, triethanolamine, triethylenediamine, and dimethylaminoethanol; and alkali metal compounds, such as sodium hydroxide and potassium hydroxide. These neutralizing agents can be used singly, or in a combination of two or more.

The percent neutralization for carboxy or sulfonic acid groups can generally be 50 to 100 mol %. The neutralizer is preferably dimethylaminoethanol in view of dispersibility.

In view of enhancing graft efficiency in the step of grafting the urethane resin (I) described below, the urethane resin (II) is preferably synthesized in the presence of an excess of hydroxy groups so that hydroxy groups can remain.

The molar ratio of active hydrogen groups of the polyol and the compound containing both an active hydrogen group and an ion-forming group to NCO groups of the polyisocyanate compound is preferably within the range of 1.01:1 to 3.0:1, and particularly preferably 1.05:1 to 2.0:1.0.

The reaction for synthesizing the urethane resin (II) is preferably performed at 50 to 120° C.

As a catalyst for the urethanization reaction, for example, a carboxylic acid bismuth compound, such as tris(2-ethylhexanoic acid)bismuth (III); an organic tin compound such as dibutyltin dilaurate, dibutyltin dioctoate, or stannous octoate; or a tertiary amine compound, such as triethylamine or triethylenediamine, can be used, if necessary.

Among these, bismuth catalysts, which are relatively less toxic, are preferable in view of environmental adaptability.

The urethane resin (II), which is an intermediate in the synthesis of a prepolymer, preferably has a number average molecular weight of 1000 to 20000, particularly preferably 1000 to 10000 (for example, 4000 to 9000), in view of manufacturability and flexibility of the obtained coating film.

In the present specification, the average molecular weight can be determined by using an "HLC-8120GPC" (trade name, produced by Tosoh Corporation) as a gel permeation chromatography apparatus, using four columns, i.e., one "TSKgel G4000HXL" column, two "TSKgel G3000HXL" columns, and one "TSKgel G2000HXL" column (trade names, all produced by Tosoh Corporation), and using a differential refractometer detector as a detector, under the following conditions: mobile phase: tetrahydrofuran; measurement temperature: 40° C.; and flow rate: 1 cc/min.

Synthesis of Prepolymer (Grafting of Urethane Resin (I))

The urethane resin particles of the present invention are core-shell type urethane resin particles preferably obtained by synthesizing urethane resin (I) in the presence of urethane resin (II) (synthesizing a urethane resin (II) unit and then a urethane resin (I) unit)(grafting urethane resin (I) to urethane resin (II)) to synthesize a prepolymer by a two-stage process, and dispersing the prepolymer in an aqueous medium (and if necessary, further performing a chain extension reaction).

The urethane resin (I) forms the core of the urethane resin particles of the present invention and can be synthesized by using a polyol comprising polyether polyol as an essential component and a polyisocyanate compound.

Examples of polyols include polyether polyols (polyether diols and trihydric or higher polyhydric polyether polyols), which are used as an essential component, and polyols other than polyether polyols [for example, diol compounds, polycarbonate polyols (polycarbonate diols and trihydric or higher polyhydric polycarbonate polyols), polyester polyols (polyester diols and trihydric or higher polyhydric polyester polyols), polyether ester polyols (polyether ester diols and trihydric or higher polyhydric polyether ester polyols), and the like]. Diols are preferable in view of manufacturability.

In the present invention, preferable examples of diol compounds, polyether diols, polycarbonate diols, polyester diols, and polyether ester diols that can be used as starting materials of the urethane resin (I) include the following.

Diol compounds: ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentylglycol, 1,6-hexaneglycol, 2,5-hexanediol, dipropylene glycol, 2,2,4-trimethyl-1,3-pentanediol, tricyclodecane dimethanol, 1,4-cyclohexane dimethanol, and the like. These diol compounds can be used singly, or in a combination of two or more.

Polyether diols: alkylene oxide addition products of the diol compounds described above, ring-opening (co)polymers of alkylene oxides and cyclic ethers (tetrahydrofuran and the like), such as polyethylene glycol, polypropylene glycol, (blocked or random) copolymers of ethylene glycol and propylene glycol, glycol, polytetramethylene glycol, polyhexamethylene glycol, polyoctamethylene glycol, and the like. These polyether diols can be used singly, or in a combination of two or more.

As polyether diols, polyethylene glycol, polypropylene glycol, and polytetramethylene glycol are preferable. From the viewpoint of manufacturability and physical properties of the coating film (flexibility) obtained by using a coating composition comprising the urethane resin particles, the polyether diol preferably has a number average molecular weight of 500 to 5000, particularly preferably 500 to 3000, and more particularly preferably 1000 to 3000.

Polycarbonate diols: compounds represented by the formula HO—R—(O—C(O)—O—R)x-OH (wherein R represents a $C_{1-12}$ alkylene group or a $C_{1-3}$ alkylene-$C_{3-8}$ cycloalkylene-$C_{1-3}$ alkylene group, x represents the number of repeating units in the molecule and is usually an integer of 5 to 50, and each R may be the same or different), and the like. These compounds can be obtained by a transesterification method in which a diol is reacted with a substituted carbonate (diethyl carbonate, diphenyl carbonate, etc.) under conditions such that hydroxy groups are present in excess, and a method in which the saturated aliphatic diol described above is reacted with a phosgene, or the reaction product is then further reacted, if necessary, with the saturated aliphatic diol. Examples of $C_{1-12}$ alkylene groups represented by R (saturated aliphatic diol residues) and $C_{1-3}$ alkylene-$C_{3-8}$ cycloalkylene-$C_{1-3}$ alkylene groups include those mentioned as examples in the description of polycarbonate diols among the starting materials of urethane resin (II) described above in the section "Synthesis of urethane resin (II)." These polycarbonate diols can be used singly, or in a combination of two or more.

Polyester diols: compounds obtained by polycondensing dicarboxylic acids (or dicarboxylic acid anhydrides), such as adipic acid, succinic acid, sebacic acid, glutaric acid, maleic acid, fumaric acid, and phthalic acid, with diol compounds described above, such as ethylene glycol, propylene glycol, 1,4-butanediol, 1,6-hexanediol, 1,8-octamethylenediol, and neopentyl glycol, under conditions such that hydroxy groups are present in excess. Specific examples thereof include ethylene glycol-adipic acid condensation products, butanediol-adipic acid condensation products, hexamethylene glycol-adipic acid condensation products, ethylene glycol-propylene glycol-adipic acid condensation products, and polylactone diols obtained by subjecting lactone to ring-opening polymerization using glycol as an initiator.

Polyether ester diols: compounds obtained by adding ether group-containing diols (e.g., the polyether diol and diethylene glycol mentioned above) or mixtures thereof with other glycols to dicarboxylic acids (or dicarboxylic acid anhydrides) as described above as examples of polyester diols and then reacting alkylene oxides therewith, such as polytetramethylene glycol-adipic acid condensation products. These polyether ester diols can be used singly, or in a combination of two or more.

From the viewpoint of physical properties (flexibility) of the coating film of a coating composition obtained by using the obtained urethane resin particles, the urethane resin (I) preferably contains a polyether polyol in a concentration of 30 to 100 mass %, particularly preferably 50 to 100 mass %, and more particularly preferably 70 to 100 mass, based on the total amount of the polyol component of the urethane resin (I).

Examples of polyisocyanate compounds include isophorone diisocyanate (IPDI), 2,4-tolylene diisocyanate (2,4-TDI), and a mixture thereof with 2,6-tolylene diisocyanate (2,6-TDI), 4 4'-diphenylmethane diisocyanate, 1,4-phenylene diisocyanate, 1,5-naphthalene diisocyanate, hexamethylene diisocyanate (HMDI), trimethylhexamethylene diisocyanate, cyclohexane-1,4-diisocyanate, 4,4'-dicyclohexylmethane diisocyanate (hydrogenated MDI), xylylene diisocyanate, tetramethylxylylene diisocyanate, and the like.

If necessary, trimers of the above TDI, HMDI, IPDI, etc., or trivalent polyisocyanates that are reactants with trimethylolpropane or the like can also be used. These polyisocyanate compounds can be used singly, or in a combination of two or more.

From the viewpoint of yellowing resistance of the coating film of a coating composition obtained by using the urethane resin particles, the polyisocyanate compound is preferably a polyisocyanate compound having a saturated aliphatic structure or a saturated alicyclic structure. Specific examples of polyisocyanate compounds having a saturated aliphatic structure include hexamethylene diisocyanate (HMDI) and the like. Specific examples of polyisocyanate compounds having a saturated alicyclic structure include isophorone diisocyanate (IPDI), 4,4'-dicyclohexylmethane diisocyanate (hydrogenated MDI), and the like.

From the viewpoint of physical properties of the coating film of a coating composition obtained by using the urethane resin particles, the polyisocyanate compound preferably has a number average molecular weight of 100 to 2000, particularly preferably 100 to 1000, and more particularly preferably 100 to 500.

From the viewpoint of obtaining an isocyanate-terminated prepolymer as a final prepolymer, the urethane resin (I) is preferably synthesized under isocyanate excess conditions so that isocyanate groups can remain.

The molar ratio of active hydrogen groups of the polyol to NCO groups of the polyisocyanate compound is preferably in the range of 1.01:1 to 3.0:1, and particularly preferably 1.05:1 to 2.0:1.0.

The synthesis reaction of the urethane resin (I) is preferably carried out at 50 to 120° C.

As a catalyst for the urethanization reaction, carboxylic acid bismuth compounds such as tris(2-ethylhexanoic acid) bismuth (III); organic tin compounds such as dibutyltin dilaurate, dibutyltin dioctoate, and stannous octoate; and tertiary amine compounds such as triethylamine and triethylenediamine can be used, if necessary.

Among these, bismuth catalysts, which are relatively less toxic, are preferable from the viewpoint of environmental adaptability.

In this way, a prepolymer having a structure in which urethane resin (I) and urethane resin (II) are grafted together.

In the synthesis of the prepolymer (synthesis of urethane resin (II)→synthesis of urethane resin (I)), an organic solvent that is inert to isocyanate groups and does not impair the urethanation reaction can be used. Examples of such organic solvents include aromatic hydrocarbon solvents such as toluene and xylene; ester solvents such as ethyl acetate and butyl acetate; ketone solvents such as methyl ethyl ketone and cyclohexanone; and the like. Among these, ketone solvents and ester solvents can be preferably used from the viewpoint of aqueous dispersion stability.

If necessary, some or all of the isocyanate groups of the urethane prepolymer may be blocked with a blocking agent to yield blocked isocyanate groups.

A blocking agent is used to block free isocyanate groups. When blocked polyisocyanate groups are heated at, for example, a temperature of 100° C. or higher, and preferably 130° C. or higher, isocyanate groups are regenerated and can readily react with functional groups, such as hydroxy groups.

Examples of the blocking agent include phenol, cresol, xylenol, nitrophenol, ethylphenol, hydroxydiphenyl, butylphenol, isopropylphenol, nonylphenol, octylphenol, methyl hydroxybenzoate, and like phenol blocking agents; ε-caprolactam, δ-valerolactam, γ-butyrolactam, β-propiolactam, and like lactam blocking agents; methanol, ethanol, propyl alcohol, butyl alcohol, amyl alcohol, lauryl alcohol, and like aliphatic alcohol blocking agents; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, and like ether blocking agents; benzyl alcohol; glycolic acid; methyl glycolate, ethyl glycolate, butyl glycolate, and like glycolates; lactic acid, methyl lactate, ethyl lactate, butyl lactate, and like lactates; methylol urea, methylol melamine, diacetone alcohol, 2-hydroxyethyl acrylate, 2-hydroxyethyl methacrylate, and like alcohol blocking agents; formamide oxime, acetamide oxime, acetoxime, methyl ethyl ketoxime, diacetyl monoxime, benzophenone oxime, cyclohexane oxime, and like oxime blocking agents; dimethyl malonate, diethyl malonate, ethyl acetoacetate, methyl acetoacetate, acetylacetone, and like active methylene blocking agents; butyl mercaptan, t-butyl mercaptan, hexyl mercaptan, t-dodecyl mercaptan, 2-mercaptobenzothiazole, thiophenol, methylthiophenol, ethylthiophenol, and like mercaptan blocking agents; acetanilide, acetanisidide, acetotoluide, acrylamide, methacrylamide, acetic acid amide, stearic acid amide, benzamide, and like acid amide blocking agents; succinimide, phthalimide, maleimide, and like imide blocking agents; diphenylamine, phenylnaphthylamine, xylidine, N-phenylxylidine, carbazole, aniline, naphthylamine, butylamine, dibutylamine, butylphenylamine, and amine blocking agents; imidazole, 2-ethylimidazole, and like imidazole blocking agents; 3,5-dimethylpyrazole and like pyrazole blocking agents; urea, thiourea, ethylene urea, ethylenethiourea, diphenylurea, and like urea blocking agents; phenyl N-phenylcarbamate and like carbamate blocking agents; ethyleneimine, propyleneimine, and like imine compounds; sodium bisulfite, potassium bisulfite, and like sulfite compounds; and the like.

Preferred among these are oxime, lactam, and pyrazole blocking agents. Pyrazole blocking agents are particularly preferable in view of imparting low-temperature curability.

In view of aqueous dispersion stability and water resistance of the coating film of a coating composition obtained by using the urethane resin particles, the urethane prepolymer preferably has an acid value of 5 to 40 mg KOH/g, particularly preferably 5 to 30 mg KOH/g, and more particularly preferably 10 to 30 mg KOH/g.

In view of production stability and flexibility of the obtained coating film, the urethane prepolymer preferably has a hydroxy value of 0 to 100 mg KOH/g, particularly preferably 0 to 50 mg KOH/g, more particularly preferably 0 to 30 mg KOH/g, and even more particularly preferably 0 to 10 mg KOH/g.

In view of manufacturability, the urethane prepolymer preferably has a number average molecular weight of 2000 to 50000, particularly preferably 2000 to 30000, and more particularly preferably 5000 to 20000.

Synthesis of Urethane Resin Particles

An aqueous dispersion of the core-shell type urethane resin particles of the present invention can be obtained by adding deionized water optionally with a neutralizing agent for ion-forming groups to the urethane prepolymers to perform water dispersion (emulsification) and, if necessary, further performing a chain extension reaction and removing the solvent.

The neutralizing agent is not particularly limited as long as it can neutralize ion-forming groups, such as acid groups. Examples of basic compounds for neutralization include organic amines, such as ammonia, diethylamine, ethylethanolamine, diethanolamine, triethanolamine, monoethanolamine, monopropanolamine, isopropanolamine, ethylaminoethylamine, hydroxyethylamine, triethylamine, tributylamine, dimethylethanolamine, and diethylenetriamine; alkali metal hydroxides, such as caustic soda and caustic potash; and the like. These neutralizing agents can be used singly, or in a combination of two or more.

Among the above basic compounds, organic amines are preferable in view of water resistance of the coating film of a coating composition obtained by using the urethane resin particles.

Such neutralizing agents are preferably used in an amount such that the aqueous dispersion of the urethane resin particles has a final pH in the range of about 6.0 to 9.0.

It is usually appropriate that the neutralizer be used in an amount of 0.1 to 1.5 equivalents, and preferably 0.3 to 1.2 equivalents, relative to acid groups, such as carboxy.

The method for obtaining the aqueous dispersion may be, for example, dispersion using a usual stirrer. To obtain a uniform aqueous dispersion of finer particles, homomixers, homogenizers, dispersing devices, line mixers, etc., can be used.

When a chain extension reaction of the urethane prepolymer is performed (a higher molecular weight is obtained), a chain extender other than water may be added, if necessary, to react the urethane prepolymer with the chain extender. As the chain extender, a known chain extender having active hydrogen can be used. Specific examples of such chain extenders include diamine compounds, such as ethylenediamine, hexamethylenediamine, cyclohexanediamine, cyclohexylmethanediamine, and isophoronediamine; triamine compounds such as diethylenetriamine; hydrazine; and the like.

In view of enhancing the degree of chain extension, trifunctional or higher amine compounds, such as diethylenetriamine or like triamine compounds, can be used. In view of flexibility of the obtained coating film, diamine compounds, such as ethylenediamine, can be suitably used.

In order to introduce a reactive functional group, a compound containing at least one amine, such as hydroxyethylaminoethylamine, and at least one hydroxy group, in the molecule can also be preferably used.

The urethane resin particles preferably have a number average molecular weight of 2000 or more, particularly preferably 5000 or more, and more particularly preferably 10000 or more in view of dispersibility, manufacturability, and performance of the coating film of a coating composition obtained by using the urethane resin particles.

If the weight average molecular weight is less than 2,000, the performance of the coating film of a coating composition obtained by using the urethane resin particles may be low.

In view of dispersibility and storage stability, the urethane resin particles generally have an average particle size of 10 to 5,000 nm, preferably 10 to 1,000 nm, more preferably 20 to 500 nm, and even more preferably 50 to 300 nm.

In the present specification, the average particle size of the urethane resin particles refers to a value obtained by measurement at 20° C. using a submicron particle size distribution analyzer after dilution with deionized water according to a usual method. For example, a COULTER N4 (trade name, produced by Beckman Coulter, Inc.) may be used as the submicron particle size distribution analyzer.

The urethane group concentration of the urethane resin particles is preferably 0.3 to 5.0 mol/kg, particularly preferably 0.5 to 4.0 mol/kg, and more particularly preferably 0.5 to 3.0 mol/kg, in view of physical properties of the coating film of a coating composition obtained by using the urethane resin particles.

The urea group concentration of urethane resin particles is preferably 0 to 2.0 mol/kg, particularly preferably 0 to 1.5 mol/kg, and more particularly preferably 0 to 1.0 mol/kg in view of physical properties of the coating film of a coating composition obtained by using the urethane resin particles.

The urethane resin particles preferably have an acid value of 5 to 40 mg KOH/g, particularly preferably 5 to 30 mg KOH/g, and more particularly preferably 10 to 30 mg KOH/g from the two viewpoints of aqueous dispersion stability and water resistance of the coating film of a coating composition obtained by using the urethane resin particles.

In order to introduce a reactive functional group, the urethane resin particles preferably have a hydroxy value of 0 to 100 mg KOH/g, particularly preferably 0 to 50 mg KOH/g, and more particularly preferably 0 to 10 mg KOH/g.

The solids concentration of urethane resin particles in the aqueous dispersion is preferably 20 to 50 mass %, and more preferably 30 to 50 mass %. When the solids concentration is more than 50 mass %, an aqueous dispersion may be difficult to obtain because emulsification is difficult. When the solids concentration is less than 20 mass %, such a low concentration results in a high proportion of the solvent (mainly water) component; therefore, it may be difficult to use such an aqueous dispersion as, for example, a component of an aqueous coating composition.

The viscosity of the aqueous dispersion of urethane resin particles as measured using a B-type viscometer (Rotor No. 1, 6 rpm) is preferably 1 to 10000 mPa·s, particularly preferably 1 to 1000 mPa·s, and more particularly preferably 1 to 500 mPa·s.

Coating Composition

When the urethane resin particles of the present invention are used to produce a coating composition, the resulting coating composition has excellent storage stability, and the coating film obtained by using the composition has excellent physical properties. Therefore, the urethane resin particles of the present invention can be preferably used for coating compositions.

A coating composition can be obtained by combining the urethane resin particles of the present invention and a film-forming resin, optionally with a crosslinking agent. As described above, the urethane resin particles of the present invention are usually synthesized as a dispersion in an aqueous solvent. Accordingly, the coating composition of the present invention is usually an aqueous coating composition.

As the film-forming resin, a water-soluble or water-dispersible film-forming resin can be used. Examples of the type of resin include acrylic resins, polyester resins, alkyd resins, polyurethane resins, and the like. The film-forming resin preferably contains a crosslinkable functional group, such as hydroxy, carboxy, or epoxy.

Examples of the crosslinking agent include melamine resins, isocyanate compounds, blocked isocyanate compounds, carbodiimide compounds, and the like.

In the coating composition comprising the urethane resin particles of the present invention, the amount of the urethane resin particles of the present invention is preferably 5 to 90 mass %, particularly preferably 10 to 70 mass %, and more particularly preferably 15 to 50 mass %, based on the total solids content of the resin components, including the film-forming resin and the crosslinking agent, in view of the performance of the obtained coating film, cost, etc.

The coating composition may further comprise coloring pigments, extender pigments, effect pigments, and the like.

Examples of the coloring pigments include titanium oxide, zinc oxide, carbon black, molybdenum red, Prussian blue, cobalt blue, azo pigments, phthalocyanine pigments, quinacridone pigments, isoindoline pigments, threne pigments, perylene pigments, and the like. Among these, titanium oxide and carbon black can be preferably used. These coloring pigments may also be used singly, or in a combination of two or more.

Examples of the extender pigments include clay, kaolin, barium sulfate, barium carbonate, calcium carbonate, talc, silica, alumina white, and the like. These extender pigments may also be used singly, or in a combination of two or more.

If necessary, the coating composition may comprise additives, such as thickeners, curing catalysts, ultraviolet absorbers, light stabilizers, antifoaming agents, plasticizers, organic solvents, surface control agents, antisettling agents, and film-forming auxiliaries.

Preferable Aqueous Coating Composition of the Present Invention

In a preferred embodiment, the present invention provides an aqueous coating composition further containing, in addition to the urethane resin particles of the present invention described above, a reactive group-containing resin (B) and, if necessary, a crosslinking agent (C). This aqueous coating composition is preferable in view of finished appearance of the obtained coating film.

Urethane Resin Particles (A)

In this specification, the urethane resin particles of the present invention described above may be referred to as "urethane resin particles (A)." The starting materials, production methods, etc., for the urethane resin particles (A) are as described above.

Reactive Group-Containing Resin (B)

The reactive group-containing resin is a resin other than the urethane resin particles (A). The type of the reactive group-containing resin is not particularly limited as long as it is a reactive group-containing resin. Examples include acrylic resins, polyester resins, urethane-modified polyester resins, acrylic-modified polyester resins, epoxy resins, and the like.

The reactive group refers to a functional group having reactivity that allows a crosslinking reaction to proceed. Specific examples include functional groups having reactivity, such as hydroxy, acid, carbonyl, N-methylol alkyl ether, isocyanate, epoxy, amino, alkoxysilyl, carbodiimide, and hydrazide groups.

In the present invention, acrylic resins and polyester resins can preferably be used. These resins are described in more detail below.

Acrylic Resin

The acrylic resin as referred to herein is an acrylic resin that is other than the urethane resin particles (A) and that can be synthesized by copolymerizing polymerizable unsaturated monomers, such as vinyl monomers, according to a known method.

The acrylic resin may be synthesized by emulsion polymerization or solution polymerization, or both polymerization methods may be used in combination. When the acrylic resin is synthesized by solution polymerization, it is preferable to use, as an organic solvent for the reaction, a hydrophilic organic solvent, such as a propylene glycol ether-based solvent or a dipropylene glycol ether-based solvent. In view of water dispersibility, the acrylic resin preferably contains acid groups, such as carboxy.

When the acrylic resin is synthesized by emulsion polymerization, the acrylic resin can be easily obtained by, for example, subjecting the monomer components mentioned above to emulsion polymerization in the presence of an emulsifier. Examples of emulsifiers include nonionic surfactants, anionic surfactants, copolymerizable-unsaturated-group-containing reactive surfactants, and the like. The acrylic resin can be obtained by emulsion polymerization using a polymerization initiator in the presence of one or more types of these emulsifiers. The acrylic resin can also be obtained by known suspension polymerization other than emulsion polymerization.

As the polymerizable unsaturated monomers, known polymerizable unsaturated monomers can be used. Examples include reactive group-containing polymerizable unsaturated monomers and other polymerizable unsaturated monomers.

Examples of reactive groups of reactive group-containing polymerizable unsaturated monomers include functional groups having reactivity, such as hydroxy, acid, carbonyl, N-methylol alkyl ether, isocyanate, epoxy, amino, alkoxysilyl, carbodiimide, and hydrazide groups.

Examples of hydroxy-containing polymerizable unsaturated monomers include 2-hydroxyethyl (meth)acrylate, hydroxypropyl (meth)acrylate, 4-hydroxybutyl (meth)acrylate, tetrahydrofurfuryl (meth)acrylate, ε-caprolactone-modified tetrahydrofurfuryl (meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate, phthalic acid mono-hydroxyethyl (meth)acrylate, and the like.

Examples of acid group-containing polymerizable unsaturated monomers include carboxy- or acid anhydride group-containing polymerizable unsaturated monomers and the like.

Examples of carboxy- or acid anhydride group-containing polymerizable unsaturated monomers include acrylic acid, methacrylic acid, maleic acid, fumaric acid, crotonic acid, itaconic acid, β-carboxyethyl acrylate, and like unsaturated carboxylic acids; and acid anhydrides thereof.

Examples of polymerizable unsaturated monomers containing acid groups other than carboxy or acid anhydride groups include 2-acrylamide-2-methylpropanesulfonic acid; allylsulfonic acid; a sodium salt of styrenesulfonic acid; sulfoethyl methacrylate, and a sodium salt and an ammonium salt of sulfoethyl methacrylate; and the like.

Examples of carbonyl-containing polymerizable unsaturated monomers include acrolein; diacetone acrylamide; diacetone methacrylamide; formylstyrol; $C_{4-7}$ vinyl alkyl ketones, such as vinyl methyl ketone, vinyl ethyl ketone, and vinyl butyl ketone; and the like. Particularly preferred among these are diacetone acrylamide and diacetone methacrylamide.

Examples of N-methylol alkyl ether group-containing polymerizable unsaturated monomers include N-methylolacrylamide butyl ether and the like.

The isocyanate-containing polymerizable unsaturated monomer is a compound having at least one unblocked isocyanate group and at least one radically polymerizable double bond per molecule. Examples include methacryloylisocyanate, 2-isocyanatoethyl methacrylate, m- or p-isopropenyl-α,α'-dimethylbenzyl isocyanate, 1:1 (molar ratio) adducts of a hydroxy-containing polymerizable unsaturated monomer and a diisocyanate compound (e.g., an equimolar adduct of 2-hydroxyethyl acrylate and isophorone diisocyanate), and the like.

Examples of epoxy-containing polymerizable unsaturated monomers include glycidyl acrylate, glycidyl methacrylate, CYCLOMER A-200 (an alicyclic epoxy-containing monomer), CYCLOMER M-100 (an alicyclic epoxy-containing monomer), and the like.

Examples of amino-containing polymerizable unsaturated monomers include dimethylaminoethyl acrylate, dimethylaminoethyl methacrylate, diethylaminoethyl acrylate, diethylaminoethyl methacrylate, dimethylaminopropyl acrylamide, dimethylaminopropyl methacrylamide, and the like.

Examples of alkoxysilyl-containing polymerizable unsaturated monomers include vinyltrimethoxysilane, vinyltriethoxysilane, vinyltripropoxysilane, vinyltributoxysilane, (meth)acryloyloxymethyltrimethoxysilane, (meth)acryloyloxyethyltrimethoxysilane, γ-(meth)acryloyloxypropyltrimethoxysilane, γ-(meth)acryloyloxypropyltriethoxysilane, (meth)acryloyloxyethyltriethoxysilane, (meth)acryloyloxypropyltributoxysilane, vinyltris-β-methoxyethoxysilane, divinylmethoxysilane, divinyldi-β-methoxyethoxysilane, and the like.

Examples of other polymerizable unsaturated monomers include $C_1$-$C_{24}$ alkyl or cycloalkyl esters of (meth)acrylic acid, such as methyl (meth)acrylate, ethyl (meth)acrylate, butyl (meth)acrylate, 2-ethylhexyl (meth)acrylate, lauryl (meth)acrylate, and cyclohexyl (meth)acrylate; $C_1$-$C_{16}$ alkoxyalkyl esters of (meth)acrylic acid, such as methoxybutyl acrylate, methoxybutyl methacrylate, methoxyethyl acrylate, methoxyethyl methacrylate, ethoxybutyl acrylate, ethoxybutyl methacrylate, and phenoxyethyl (meth)acrylate; aromatic unsaturated monomers, such as styrene, vinyltoluene, α-methylstyrene, N-vinylpyrrolidone, and vinylpyridine; olefins, such as ethylene, propylene, butylene, and pentene; diene compounds, such as butadiene, isoprene, and chloroprene; cyclohexenyl (meth)acrylate, dicyclopentenyl (meth)acrylate, dicyclopentenyloxyethyl (meth)acrylate, isobornyl (meth)acrylate, benzyl (meth)acrylate, N-butoxy (meth)acrylamide, adducts of glycidyl (meth)acrylate and amines, vinyl propionate, vinyl acetate, vinyl pivalate, VeoVa monomer (a product of Shell Chemical Co.), and the like.

When the acrylic resin is synthesized by solution polymerization, the acrylic resin preferably has a weight average molecular weight of 1,000 to 200,000, and particularly preferably 2,000 to 100,000, in view of weather resistance, finishing quality, etc.

If the acrylic resin contains hydroxy groups, when the acrylic resin is synthesized by solution polymerization, the acrylic resin preferably has a hydroxy value of 10 to 250 mg KOH/g, and particularly preferably 30 to 150 mg KOH/g, in view of the curability of the coating film; when the acrylic resin is synthesized by emulsion polymerization, the acrylic resin preferably has a hydroxy value of 5 to 150 mg KOH/g, and particularly preferably 10 to 90 mg KOH/g, in view of the water resistance and curability of the coating film.

If the acrylic resin contains acid groups, when the acrylic resin is synthesized by solution polymerization, the acrylic resin preferably has an acid value of 3 to 150 mg KOH/g, and particularly preferably 5 to 70 mg KOH/g, in view of the dispersion stability in the aqueous coating composition and the curability and adhesion of the coating film; when the acrylic resin is synthesized by emulsion polymerization, the acrylic resin preferably has an acid value of 0.01 to 100 mg KOH/g, and particularly preferably 0.1 to 75 mg KOH/g, in view of the water resistance of the coating film.

When the acrylic resin contains acid groups and is dispersed in water, the acrylic resin is preferably neutralized by a neutralizer, to increase water dispersibility. This allows the acrylic resin to be mixed with water and to be dispersed in water more readily.

Examples of neutralizers include hydroxides of alkali metals or alkaline earth metals, such as sodium hydroxide, potassium hydroxide, lithium hydroxide, calcium hydroxide, and barium hydroxide; ammonia; primary monoamine compounds, such as ethylamine, propylamine, butylamine, cyclohexylamine, monoethanolamine, isopropanolamine, neopentanolamine, 2-aminopropanol, 3-aminopropanol, and 2-amino-2-methylpropanol; secondary monoamine compounds, such as diethylamine, dibutylamine, diethanolamine, dipropylamine, diisopropanolamine, N-methylethanolamine, N-ethylethanolamine, and N-methylisopropanolamine; tertiary monoamine compounds, such as triethylamine, tributylamine, dimethylethanolamine, diethylethanolamine, methyldiethanolamine, dimethylaminoethanol, and triethanolamine; polyamine compounds, such as ethylenediamine, diethylenetriamine, hydroxyethylaminoethylamine, ethylaminoethylamine, and methylaminopropylamine; pyridine; morpholine; and the like.

Among these, primary monoamine compounds, secondary monoamine compounds, tertiary monoamine compounds, and polyamine compounds are preferred.

Polyester Resin

The polyester resin can be synthesized by an esterification reaction of a polybasic acid with a polyhydric alcohol in a standard manner by a known method. In view of water dispersibility, the polyester resin preferably contains acid groups, such as carboxy.

Polybasic acids are compounds having two or more carboxy groups per molecule. Examples include phthalic acid, isophthalic acid, terephthalic acid, succinic acid, adipic acid, azelaic acid, sebacic acid, naphthalene dicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methyl hexahydrophthalic acid, and anhydrides thereof; and the like.

Polyhydric alcohols are compounds having two or more hydroxy groups per molecule. Examples include glycol compounds, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, and neopentyl glycol hydroxypivalate; polylactone diols obtained by adding lactone compounds, such as ε-caprolactone, to such glycol compounds; polyester diol compounds, such as bis(hydroxyethyl)terephthalate; 1,3-cyclohexanedimethanol, 1,4-cyclohexanedimethanol, tricyclodecanedimethanol, hydrogenated bisphenol A, hydrogenated bisphenol F, spiroglycol, dihydroxymethyltricyclodecane, glycerol, trimethylolpropane, trimethylolethane, diglycerol, triglycerol, 1,2,6-hexanetriol, pentaerythritol, dipentaerythritol, dipentaerythritol, sorbitol, mannitol; and hydroxycarboxylic acids, such as 2,2-dimethylolpropionic acid, 2,2-dimethylolbutanoic acid, 2,2-dimethylolpentanoic acid, 2,2-dimethylolhexanoic acid, and 2,2-dimethyloloctanoic acid; and the like.

Also usable as the polyester resin are fatty acid-modified polyester resins that are modified with fatty acids of (semi-)drying oils, such as linseed oil fatty acid, coconut oil fatty acid, safflower oil fatty acid, soybean oil fatty acid, sesame oil fatty acid, perilla oil fatty acid, hemp oil fatty acid, tall oil fatty acid, and dehydrated castor oil fatty acid. It is usually suitable that the proportion of such modifying fatty acid be not more than 30 wt. % in terms of oil length. The polyester resin may be one obtained by partially reacting a monobasic acid, such as benzoic acid.

The polyester resin may be one in which an α-olefin epoxide, such as propylene oxide or butylene oxide, a monoepoxy compound, such as Cardura E10 (produced by Japan Epoxy Resins Co., Ltd., trade name, glycidyl ester of a synthetic hyperbranched saturated fatty acid), or the like is reacted with acid groups in the polyester resin.

Carboxy groups can be introduced into the polyester resin by, for example, adding an acid anhydride to a hydroxy-containing polyester for half-esterification.

When the polyester resin contains hydroxy groups, the polyester resin preferably has a hydroxy value of 10 to 250 mg KOH/g, and particularly preferably 40 to 170 mg KOH/g, in view of the water resistance and curability of the coating film.

When the polyester resin contains acid groups, the polyester resin preferably has an acid value of 5 to 100 mg KOH/g, and particularly preferably 10 to 60 mg KOH/g, in view of the water resistance and adhesion of the coating film.

The polyester resin preferably has a number average molecular weight of 1,000 to 100,000, and particularly preferably 1,000 to 50,000, in view of the water resistance and curability of the coating film.

When the polyester resin contains acid groups and is dispersed in water, the polyester resin is preferably neutralized by a neutralizer to increase water dispersibility. This allows the polyester resin to be mixed with water and to be dispersed in water more readily.

Examples of neutralizers include those mentioned in the description of the acrylic resin above.

Crosslinking Agent (C)

The crosslinking agent (C) may be contained, if necessary. There is no limitation on the crosslinking agent (C). Depending on the reactive groups of the reactive group-containing resin (B) and, when the acrylic urethane composite resin particles (A) contain crosslinking reactive groups, the crosslinking reactive groups, a crosslinking agent that is reactive with these reactive groups can be used.

Specific examples of the crosslinking agent (C) include amino resins, polyisocyanate compounds, polyhydrazide compounds, polysemicarbazide compounds, carbodiimide group-containing compounds, oxazoline group-containing compounds, epoxy compounds, polycarboxylic acids, and the like. the crosslinking agent (C) may be used singly, or in a combination of two or more.

Examples of usable amino resins include partially or fully methylolated amino resins obtained by reacting amino components with aldehyde components. Examples of the amino components include melamine, urea, benzoguanamine, acetoguanamine, steroguanamine, spiroguanamine, dicyandiamide, and the like. Examples of the aldehyde components include formaldehyde, paraformaldehyde, acetaldehyde, benzaldehyde, and the like.

The methylolated amino resins in which some or all of the methylol groups have been etherified with suitable alcohol are also usable. Examples of alcohols that can be used for etherification include methyl alcohol, ethyl alcohol, n-propyl alcohol, i-propyl alcohol, n-butyl alcohol, i-butyl alcohol, 2-ethyl-1-butanol, 2-ethyl-1-hexanol, and the like.

The amino resin is preferably a melamine resin. Particularly preferable are a methyl-etherified melamine resin obtained by partially or fully etherifying methylol group(s) of a partially or fully methylolated melamine resin with methyl alcohol; a butyl-etherified melamine resin obtained by partially or fully etherifying methylol group(s) of a partially or fully methylolated melamine resin with butyl alcohol; and a methyl-butyl mixed etherified melamine resin obtained by partially or fully etherifying methylol groups of a partially or fully methylolated melamine resin with methyl alcohol and butyl alcohol. A methyl-butyl mixed etherified melamine resin is more preferable.

The melamine resin preferably has a weight average molecular weight of 400 to 6,000, more preferably 500 to 4,000, and even more preferably 600 to 3,000.

A commercially available melamine resin can be used as the melamine resin. Examples of commercially available melamine resins include Cymel 202, Cymel 203, Cymel 204, Cymel 211, Cymel 212, Cymel 238, Cymel 251, Cymel 253, Cymel 254, Cymel 303, Cymel 323, Cymel 324, Cymel 325, Cymel 327, Cymel 350, Cymel 370, Cymel 380, Cymel 385, Cymel 1156, Cymel 1158, Cymel 1116, and Cymel 1130 (produced by Nihon Cytec Industries Inc.); Resimene 735, Resimene 740, Resimene 741, Resimene 745, Resimene 746, and Resimene 747 (produced by Monsanto Co., Ltd.); U-VAN 120, U-VAN 20HS, U-VAN 20SE, U-VAN 2021, U-VAN 2028, and U-VAN 28-60 (produced by Mitsui Chemicals, Inc.); Sumimal M55, Sumimal M30W, and Sumimal M50W (produced by Sumitomo Chemical Co., Ltd.); and the like.

When a melamine resin is used as the crosslinking agent (C), examples of usable curing catalysts include sulfonic acids, such as p-toluenesulfonic acid, dodecylbenzenesulfonic acid, and dinonylnaphthalene sulfonic acid; salts obtained by neutralizing such sulfonic acids with amines; salts obtained by neutralizing phosphoric ester compounds with amines; and the like.

The polyisocyanate compound has at least two isocyanate groups per molecule.

Specific examples of the polyisocyanate compound include aliphatic polyisocyanates, alicyclic polyisocyanates, aromatic aliphatic polyisocyanates, aromatic polyisocyanates, derivatives of these polyisocyanates, and the like.

Examples of aliphatic polyisocyanates include trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethylcaproate, and like aliphatic diisocyanates; lysine ester triisocyanate, 1,4,8-triisocyanato octane, 1,6,11-triisocyanato undecane, 1,8-diisocyanato-4-isocyanato methyloctane, 1,3,6-triisocyanato hexane, 2,5,7-trimethyl-1,8-diisocyanato-5-isocyanato methyloctane, and like aliphatic triisocyanates; and the like.

Examples of alicyclic polyisocyanates include 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexylisocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or a mixture thereof, norbornane diisocyanate, and like alicyclic diisocyanates; 1,3,5-triisocyanato cyclohexane, 1,3,5-trimethylisocyanato cyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2- isocyanatoethyl)-2-isocyanatomethyl-2-(3-isocyanatopropyl)-bicyclo(2.2.1)heptane, 6-(2-isocyanatoethyl)-2-isocyanatomethyl-2-(3-isocyanatopropyl)-bicyclo(2.2.1)heptane, and like alicyclic triisocyanates; and the like.

Examples of aromatic aliphatic polyisocyanates include 1,3- or 1,4-xylylene diisocyanate or a mixture thereof, ω,ω'-diisocyanato-1,4-diethylbenzene, 1,3- or 1,4-bis(l-isocyanato-1-methylethyl)benzene (common name: tetramethylxylylene diisocyanate) or a mixture thereof, and like aromatic aliphatic diisocyanates; 1,3,5-triisocyanatomethylbenzene and like aromatic aliphatic triisocyanates; and the like.

Examples of aromatic polyisocyanates include m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate, 4,4'-diphenylether diisocyanate, and like aromatic diisocyanates; triphenylmethane-4,4',4"-triisocyanate, 1,3,5-triisocyanato benzene, 2,4,6-triisocyanato toluene, and like aromatic triisocyanates; diphenylmethane-2,2',5,5'-tetraisocyanate and like aromatic tetraisocyanates; and the like.

Examples of polyisocyanate derivatives include dimers, trimers, biurets, allophanates, carbodiimides, urethodiones, urethoimines, isocyanurates, oxadiazine triones, polymethylene polyphenyl polyisocyanates (crude MDI, polymeric MDI), crude TDI, and the like of the polyisocyanate compounds mentioned above.

A blocked polyisocyanate compound in which free isocyanate groups are blocked with a blocking agent can also be used as a polyisocyanate compound. When a blocked polyisocyanate compound is heated at, for example, 100° C. or higher, and preferably 130° C. or higher, isocyanate groups are regenerated and can readily react with reactive groups.

Examples of the blocking agent include phenol, cresol, xylenol, nitrophenol, ethylphenol, hydroxydiphenyl, butylphenol, isopropylphenol, nonylphenol, octylphenol, methyl hydroxybenzoate, and like phenol blocking agents; ε-caprolactam, δ-valerolactam, γ-butyrolactam, β-propiolactam, and like lactam blocking agents; methanol, ethanol, propyl alcohol, butyl alcohol, amyl alcohol, lauryl alcohol, and like aliphatic alcohol blocking agents; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, and like ether blocking agents; benzyl alcohol; glycolic acid; methyl glycolate, ethyl glycolate, butyl glycolate, and like glycolates; lactic acid, methyl lactate, ethyl lactate, butyl lactate, and like lactates; methylol urea, methylol melamine, diacetone alcohol, 2-hydroxyethyl acrylate, 2-hydroxyethyl methacrylate, and like alcohol blocking agents; formamide oxime, acetamide oxime, acetoxime, methyl ethyl ketoxime, diacetyl monoxime, benzophenone oxime, cyclohexane oxime, and like oxime blocking agents; dimethyl malonate, diethyl malonate, ethyl acetoacetate, methyl acetoacetate, acetylacetone, and like active methylene blocking agents; butyl mercaptan, t-butyl mercaptan, hexyl mercaptan, t-dodecyl mercaptan, 2-mercaptobenzothiazole, thiophenol, methylthiophenol, ethylthiophenol, and like mercaptan blocking agents; acetanilide, acetanisidide, acetotoluide, acrylamide, methacrylamide, acetic acid amide, stearic acid amide, benzamide, and like acid amide blocking agents; succinimide, phthalimide, maleimide, and like imide blocking agents; diphenylamine, phenylnaphthylamine, xylidine, N-phenylxylidine, carbazole, aniline, naphthylamine, butylamine, dibutylamine, butylphenylamine, and like amine blocking agents; imidazole, 2-ethylimidazole, and like imidazole blocking agents; 3,5-dimethylpyrazole and like pyrazole blocking agents; urea, thiourea, ethylene urea, ethylene thiourea, diphenylurea, and like urea compounds; phenyl N-phenylcarbamate and like carbamate blocking agents; ethyleneimine, propyleneimine, and like imine blocking agents; sodium bisulfite, potassium bisulfite, and like sulfite blocking agents; and the like.

When a polyisocyanate compound is used as the crosslinking agent (C), an organic tin compound or the like can be used as a curing catalyst.

The polyisocyanate compound can be used, for example, as a crosslinking agent for a resin containing a hydroxy or amino group.

The polyhydrazide compound has at least two hydrazide groups per molecule.

Examples of polyhydrazide compounds include oxalic acid dihydrazide, malonic acid dihydrazide, succinic acid dihydrazide, glutaric acid dihydrazide, adipic acid dihydrazide, sebacic acid dihydrazide, and like $C_{2-18}$ saturated aliphatic carboxylic acid dihydrazides; maleic acid dihydrazide, fumaric acid dihydrazide, itaconic acid dihydrazide, and like monoolefinic unsaturated dicarboxylic acid dihydrazides; carbonic acid dihydrazide and like carbonic acid polyhydrazides; dihydrazide of phthalic acid, terephthalic acid, or isophthalic acid, dihydrazide, trihydrazide, or tetrahydrazide of pyromellitic acid, and like aromatic polycarboxylic acid polyhydrazides; nitrilotriacetic acid trihydrazide, citric acid trihydrazide, 1,2,4-benzene trihydrazide, and like aliphatic trihydrazide; ethylenediaminetetraacetic acid tetrahydrazide, 1,4,5,8-naphthoic acid tetrahydrazide, and like tetrahydrazides; polyhydrazides obtained by reacting an oligomer containing a carboxylic acid lower alkyl ester group with hydrazine or hydrazine hydrate (see JPS52-022878B); and the like.

If the polyhydrazide compound is excessively hydrophobic, dispersion in water is difficult, and a uniform crosslinked coating film cannot be obtained. Accordingly, a compound having moderate hydrophilic properties and a relatively low molecular weight (about 300 or less) is preferably used. Examples of such polyhydrazide compounds include $C_4$-$C_{12}$ dicarboxylic acid dihydrazide compounds, such as succinic acid dihydrazide, glutaric acid dihydrazide, adipic acid dihydrazide, and sebacic acid dihydrazide.

The polyhydrazide compound can be used, for example, as a crosslinking agent for a carbonyl-containing resin.

The polysemicarbazide compound has at least two semicarbazide groups per molecule.

Examples of polysemicarbazide compounds include aliphatic, alicyclic, or aromatic bissemicarbazides; polyfunctional semicarbazides obtained by subjecting a diisocyanate such as hexamethylene diisocyanate or isophorone diisocyanate, or a polyisocyanate compound derived therefrom, to a reaction with an excess of N,N-substituted hydrazine, such as N,N-dimethyl hydrazine, and/or a hydrazide as mentioned above; aqueous polyfunctional semicarbazides obtained by subjecting isocyanate groups in a reaction product, which is obtained by reacting such a polyisocyanate compound and polyether with a hydrophilic group-containing active hydrogen compound, such as a polyol compound or a polyethylene glycol mono-alkyl ether compound, to a reaction with an excess of a dihydrazide as mentioned above as an example (see, for example, JPH08-151358A); semicarbazide group-containing compounds, such as a mixture of such a polyfunctional semicarbazide and such an aqueous polyfunctional semicarbazide; hydrazone group-containing compounds, such as bisacetyldihydrazone; and the like.

The polysemicarbazide compound can be used, for example, as a crosslinking agent for a carbonyl-containing resin.

The carbodiimide group-containing compound can be obtained, for example, by subjecting isocyanate groups in a polyisocyanate compound to a carbon dioxide removal reaction.

Examples of commercial products that correspond to carbodiimide group-containing compounds include Carbodilite V-02, Carbodilite V-02-L2, Carbodilite V-04, Carbodilite E-01, Carbodilite E-02 (trade names; all produced by Nisshinbo Holdings Inc.), and the like.

The carbodiimide group-containing compound can be used, for example, as a crosslinking agent for a carboxy-containing resin.

Examples of oxazoline group-containing compounds include oxazoline group-containing polymers, such as (co)polymers obtained by (co)polymerizing one or more oxazoline group-containing polymerizable unsaturated monomers optionally with one or more other polymerizable unsaturated monomers by a known method (e.g., solution polymerization or emulsion polymerization).

Examples of oxazoline group-containing polymerizable unsaturated monomers include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and the like.

Examples of other polymerizable unsaturated monomers described above include $C_1$-$C_{24}$ alkyl or cycloalkyl esters of (meth)acrylic acid, such as methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, and isobornyl (meth)acrylate; $C_2$-$C_8$ hydroxyalkyl esters of (meth)acrylic acid, such as 2-hydroxyethyl (meth)acrylate and hydroxypropyl (meth)acrylate; vinyl aromatic compounds, such as styrene and vinyltoluene; (meth)acrylamide, dimethylaminopropyl (meth)acrylamide, dimethylaminoethyl (meth)acrylate, adducts of glycidyl (meth)acrylate and amines; polyethylene glycol (meth)acrylate; N-vinylpyrrolidone; ethylene; butadiene; chloroprene; vinyl propionate; vinyl acetate; (meth)acrylonitrile; and the like. These can suitably be used singly, or in a combination of two or more.

The oxazoline group-containing compound can be used, for example, as a crosslinking agent for a carboxy-containing resin.

The epoxy compound has at least two epoxy groups per molecule. Specific examples include bis(3,4-epoxycyclohexylmethyl)adipate and like diepoxy compounds, epoxy-containing acrylic resins, and the like.

The epoxy compound can be used, for example, as a crosslinking agent for acid group- or amino group-containing resins.

Examples of polycarboxylic acids include aliphatic polybasic acids, such as adipic acid, azelaic acid, sebacic acid, 1,4-cyclohexanedicarboxylic acid, 1,2-cyclohexanedicarboxylic acid, 1,2,4-butanetricarboxylic acid, and 1,2,3,4-butanetetracarboxylic acid; aromatic polybasic acids, such as phthalic acid, isophthalic acid, terephthalic acid, and trimellitic acid; half esters obtained by addition reaction of a polyol and 1,2-acid anhydride; addition reaction products of polyepoxide and 1,2-acid anhydride in an amount of at least 2 equivalents per equivalent of the epoxy groups of the polyepoxide; carboxy-containing acrylic polymers; acrylic polymers containing half-esterified acid anhydride groups; carboxy-containing polyester polymers; and the like.

The polycarboxylic acid can be used, for example, as a crosslinking agent for epoxy group- or carbodiimide group-containing resins.

Proportions of Component (A), Component (B), and Component (C) in the Aqueous Coating Composition, and Other Components In an embodiment comprising the urethane resin particles (A), reactive group-containing resin (B), and (if necessary) crosslinking agent (C), the amounts of component (A), component (B), and component (C) in the aqueous coating composition of the present invention are preferably in the following ranges: the amount of the urethane composite resin particles (A) is 1 to 99 mass %, preferably 1 to 80 mass %, and more preferably 3 to 70 mass %, the amount of the reactive group-containing resin (B) is 1 to 99 mass %, preferably 1 to 90 mass %, and more preferably 5 to 80 mass %, and the amount of the crosslinking agent (C) is 0 to 60 mass %, preferably 0 to 40 mass %, and more preferably 0 to 30 mass %, based on the total resin solids content of the components (A), (B), and (C).

In this embodiment as well, the aqueous coating composition of the present invention may comprise one or more pigments, if necessary. Examples of pigments that can be preferably used include coloring pigments, such as titanium oxide, zinc oxide, carbon black, phthalocyanine blue, Prussian blue, cobalt blue, azo pigments, phthalocyanine pigments, quinacridone pigments, isoindoline pigments, threne pigments, and perylene pigments; extender pigments, such as talc, clay, kaolin, baryta, barium sulfate, barium carbonate, calcium carbonate, silica, and alumina white; effect pigments, such as aluminum powder, mica powder, and titanium oxide-coated mica powder; and the like.

A preferable amount of pigments is usually in the range of 0 to 250 mass %, and particularly 3 to 150 mass %, based on the total resin solids content of the components (A) and (B) and the optional component (C) when used.

In this embodiment as well, the aqueous coating composition of the present invention may further comprise, if necessary, curing catalysts, dispersants, antisettling agents, organic solvents, antifoaming agents, thickeners, UV absorbers, light stabilizers, surface control agents, etc.

Method for Producing the Coating Composition

The present invention provides a method for producing the coating composition. For example, the present invention provides a method for producing a coating composition comprising mixing the urethane resin particles of the present invention and the film-forming resin described above. The urethane resin particles of the present invention can be produced, for example, by the method described above in the section "Urethane resin particles." Thus, the present invention provides a method for producing a coating composition comprising the steps of:

(1-1) reacting a monomer mixture comprising a polyol comprising polycarbonate polyol and a polyisocyanate compound to obtain a urethane resin (II); and (1-2) reacting a monomer mixture comprising a polyol comprising polyether polyol and a polyisocyanate compound in the presence of the urethane resin (II) to synthesize a urethane resin (I) to produce a core-shell type urethane resin particle; and (2) mixing the urethane resin particle and a film-forming resin described above, wherein the urethane resin (I) forms the core of the urethane resin particle, whereas the urethane resin (II) forms the shell of the urethane resin particle. In such methods, the above-mentioned additives such as coloring pigments, extender pigments, and effect pigments may be further incorporated before, after, and/or simultaneously with the mixing step.

The substrate to be coated with the coating composition of the present invention is not particularly limited. Examples of such substrates include exterior panel parts of automotive bodies, such as passenger cars, tracks, motorcycles, and buses; automotive components; exterior panel parts of household electric appliances, such as cellular phones and audiovisual apparatus; building materials or architecture-related substrates; and the like. Among these, exterior panel parts of automotive bodies and automotive components are preferable. In particular, the aqueous coating composition comprising urethane resin particles (A) and a reactive group-containing resin (B) and (if necessary) a crosslinking agent (C) according to an embodiment of the present invention makes it possible to obtain a coating film that is excellent in coating film performance, such as water resistance, and finished appearance, such as smoothness of the coated surface, and the coating composition has excellent storage stability; therefore, the aqueous coating composition of the present invention is suitable for use, for example, as a coating composition for building materials, architecture, automobiles, or the like.

The materials for such substrates are not particularly limited. Examples thereof include metallic materials such as iron, aluminum, brass, copper, tin plate, stainless steel, galvanized steel, steels plated with a zinc alloy (e.g., Zn—Al, Zn—Ni, or Zn—Fe); plastic materials such as polyethylene resins, polypropylene resins, acrylonitrile-butadiene-styrene (ABS) resins, polyamide resins, acrylic resins, vinylidene chloride resins, polycarbonate resins, polyurethane resins, epoxy resins, and like resins, and various types of FRP; inorganic materials such as glass, cement, and concrete; wood; textile materials such as paper and cloth; and the like. Among these, metallic materials and plastic materials are preferable.

The substrate may be an exterior panel part of an automotive body, a household electric appliance, or a metal substrate, such as a steel plate that forms such a panel or appliance, the metal surface of which has been subjected to a surface treatment, such as phosphate treatment, chromate treatment, or composite oxide treatment. The substrate may have an undercoating film and/or an intermediate coating film formed on the metallic surface.

The substrate may have a coating film of a color coating composition or the like further formed on the intermediate coating surface.

When used, the aqueous coating composition of the present invention can be diluted to an appropriate viscosity by adding water and/or an organic solvent, etc., if necessary, and then applied.

The appropriate viscosity may vary depending on the formulation of the coating composition, but is, for example, generally in the range of about 20 to 60 seconds, and preferably about 25 to 50 seconds, as adjusted and measured at 20° C. using Ford Cup Viscometer No. 4. In this case, the coating composition of the present invention generally has a solids concentration of about 5 to 70 mass %, and preferably about 10 to 50 mass %.

The method for applying the coating composition of the present invention is not particularly limited. For example, known methods, such as roller coating, air spray coating, airless spray coating, rotary atomization coating, and curtain coating, can be used. In these coating methods, an electrostatic charge may be applied, if necessary. Such a coating method can be performed once or several times until the desired film thickness is obtained. The thickness of the coating film is preferably within the range of 3 to 100 μm, and particularly preferably 5 to 60 μm when cured. The coating film may be cured, for example, by heating at room temperature to 170° C., if necessary. Heat-curing can be performed by known heating means, for example, by using a hot air furnace, electric furnace, electromagnetic induction heating furnace, or like drying furnace. If necessary, pre-heating may be performed at a temperature of about 50 to 80° C. for about 3 to 10 minutes before heat-curing to promote vaporization of volatile components such as solvents.

EXAMPLES

The present invention is described in further detail below with reference to Examples and Comparative Examples. However, the present invention is not limited to these Examples. Note that "parts" and "%" are expressed on a mass basis.

Preparation of Urethane Resin Particles

Example 1A 62.3 parts of ETERNACOLL UH-100 (trade name, produced by Ube Industries, Ltd., 1,6-hexanediol-based polycarbonate diol, molecular weight: about 1,000) and 8.3 parts of dimethylolpropionic acid, which are starting materials for producing urethane resin (II), 0.1 part of NEOSTANN U-600 (trade name, produced by Nitto Kasei Co., Ltd., a bismuth catalyst), and 200 parts of a methyl ethyl ketone solvent were placed in a reaction vessel equipped with a thermometer, a thermostat, a stirrer, and a reflux condenser. After the temperature was raised to 80° C. with stirring, 29.4 parts of hydrogenated MDI (4,4'-dicyclohexylmethane diisocyanate) was added dropwise over a period of 30 minutes.

Then, while the temperature was maintained at 80° C., a reaction was allowed to proceed until an NCO value of 1 mg/g or less was achieved.

The obtained urethane resin (II) had a number average molecular weight of 8000.

76.7 parts of "PTMG-1000" (trade name, produced by Mitsubishi Chemical Corporation, polytetramethylene glycol, molecular weight: about 1000) and 22.6 parts of IPDI (isophorone diisocyanate), which are starting materials for producing urethane resin (I), were further added to this reaction product, and a reaction was allowed to proceed until an NCO value of 5.3 mg/g or less was achieved. After the reaction, upon addition of 200 parts of a methyl ethyl ketone solvent, the resulting mixture was cooled to room temperature to obtain a prepolymer solution of an acid group- and terminal isocyanate group-containing polyurethane resin. The obtained urethane prepolymer had a number average molecular weight of 16000.

Thereafter, stirring was continued, and 2.8 parts of dimethylethanolamine was added to achieve neutralization. Water dispersion (phase-inversion emulsification) was performed while adding 365.4 parts of deionized water at an appropriate time.

After the completion of water dispersion (emulsification), 0.8 parts of ethylenediamine was dissolved in 3.2 parts of deionized water. An aqueous amine solution was added dropwise over a period of 30 minutes, and stirred for 2 hours. A chain extension reaction of terminal isocyanate groups of the urethane resin with a diamine was thus performed.

Thereafter, while stirring was continued and the temperature was raised to 60° C., the solvent was removed under reduced pressure. When all the methyl ethyl ketone solvent added was distilled off, the pressure was returned to normal pressure. After cooling, deionized water overly removed by distillation was compensated to obtain an aqueous dispersion of urethane resin particles No. 1A.

The obtained urethane resin particles No. 1A had a mass solids concentration of 35%, an average particle size of 100 nm (as measured at 20° C. using a "COULTER N4" submicron particle size distribution analyzer (produced by Beckman Coulter, Inc.) in a state diluted with deionized water), an acid value of 17.5 mg KOH/g, a hydroxy value of 0 mg KOH/g, a viscosity of 50 mPa·s (a Brookfield viscometer, 60 rpm, 23° C.), a urethane concentration of 2.01 mol/kg (theoretical value), and a urea concentration of 0.13 mol/kg (theoretical value). Since the number average molecular weight of the urethane resin exceeded the elimination limit of the GPC measuring apparatus, it was unmeasurable (it is estimated to be about one million or more).

Further, transmission electron microscope (TEM) photographs of the obtained aqueous dispersion of urethane resin particles No. 1A were taken using HT7700 (produced by Hitachi High-Technologies Corporation). FIG. 1 shows the obtained TEM photographs. FIG. 1 clearly shows that the urethane resin particles No. 1A have a clear core/shell structure.

Examples 2A to 18A and Comparative Examples 1A to 3A

The aqueous dispersions of urethane resin particles Nos. 2A to 21A were obtained in the same manner as in Example 1A, except that the compositions were changed as shown in Tables 1 and 2 below. Tables 1 and 2 below include numerical property values of the obtained aqueous dispersions of the urethane resin particles.

Tables 1 and 2 show the composition ratios of each of the urethane resin (II) and urethane resin (I), based on the total amount of the components of each resin taken as 100.

In the production process, the NCO value at the reaction endpoint and the amount of the methyl ethyl ketone solvent were appropriately adjusted according to the formulation.

The aqueous dispersions of urethane resin particles Nos. 19A to 21A were for use in Comparative Examples.

Evaluation Test

The urethane resin particles 1A to 21A obtained in Examples 1A to 18A and Comparative Examples 1A to 3A were subjected to the following evaluation tests. Tables 1 and 2 below include the evaluations results.

Test Method

Flexibility: Each of the urethane resin particles was uniformly applied to a polyethylene film using a doctor blade (produced by Osaka Riko Seisakusho Co., Ltd.), and dried with a dryer to obtain a polyurethane film of 100 μm.

Using the polyurethane films thus obtained, the tensile stress at 100% strain, tensile stress at break, and tensile strain at break were measured.

Tensile Stress at 100% Strain, Tensile Stress at Break, and Tensile Strain at Break The polyurethane films having a length of 2 cm and a width of 0.5 cm were used. Using the film and AGS-20kNG (produced by Shimadzu Corporation), each parameter was measured according to the method disclosed in JIS K7127 (JIS K7161). Table 2 shows that the tensile stress at break of the polyurethane films of the urethane resin particles obtained in Example 17A and Comparative Example 2A was unmeasurable because the tensile strain measurement limit of the equipment (3000% or more) was reached before breakage of the films.

Based on the measured values, flexibility was relatively evaluated according to the following criteria.

5: The tensile stress at 100% strain is less than 2 MPa; the tensile stress at break is less than 30 MPa; and the tensile strain at break is 1000% or more.
4: The measured values do not satisfy the conditions defined above in 5. The tensile stress at 100% strain is less than 5 MPa; the tensile stress at break is less than 50 MPa; and the tensile strain at break is 500% or more.
3: The measured values do not satisfy the conditions defined above in 4 or 5; and the tensile strain at break is 500% or more.
2: The measured values do not satisfy the conditions defined above in 3, 4, or 5; and the tensile strain at break is 200% or more.
1: The measured values do not satisfy any of the above conditions in 2 to 5.

Storage stability: Each of the aqueous dispersions of the urethane resin particles was added to WP-305 (produced by Kansai Paint Co., Ltd., trade name, a polyester resin/melamine resin-based aqueous intermediate coating composition) in an amount of 20 mass % (on a solids basis), and individually placed in sealable glass bottles. The bottles were placed in a 40° C. constant-temperature water bath.

The bottles were then removed from the bath every day for the first 1 week, and thereafter removed from the bath every one week to check for the presence or absence of coagulation, and the viscosity. A record was made when coagulation or a viscosity change of ±30% or more was observed.

The evaluation data in Tables 1 and 2 show the length of the period from the beginning of the test to the above-described degradation state expressed in terms of day or week. For example, 2D indicates that 2 days after the beginning of the test, the coating composition comprising the urethane resin particles was in the degradation state described above; and 4W< indicates that the coating composition did not fall into the degradation state even after 4 weeks, and that good storage stability was exhibited.

TABLE 1

| | | | | | | | | Examples | | | | | |
|---|---|---|---|---|---|---|---|---|---|---|---|---|---|
| | | | 1A | 2A | 3A | 4A | 5A | 6A | 7A | 8A | 9A | 10A | 11A |
| Urethane resin particles No. | | | 1A | 2A | 3A | 4A | 5A | 6A | 7A | 8A | 9A | 10A | 11A |
| Urethane resin (II) component (total: 100) | OH component | ETERNACOLL UH-100*1 | 62.3 | 31.2 | | | | | | | | | 64.1 |
| | | ETERNACOLL UH-300*2 | | | 72.4 | | | | | | | | |
| | | ETERNACOLL UC-100*3 | | | | 62.3 | 62.3 | 62.3 | 62.3 | 71.5 | 52 | 67 | |
| | | PTMG-1000*4 | | 31.1 | | | | | | | | | |
| | | 1,6-Hexanediol | 8.3 | 8.3 | 8.3 | 8.3 | 8.3 | 8.3 | 8.3 | 8.3 | 13.4 | 6 | 8.3 |
| | | Trimethylolpropane | | | | | | | | 20.3 | | | |
| | | Dimethylolpropionic acid | 29.4 | 29.4 | 19.3 | 29.4 | 29.4 | 29.4 | 29.4 | | 34.6 | 27.0 | 27.6 |
| | | BES*5 | | | | | | | | | | | |
| | NCO component | Hydrogenated MDI | | | | | | | | | | | |
| | | Hexamethylene diisocyanate | 35 | 35 | 35 | 35 | 35 | 35 | 35 | 35 | 56 | 25 | 35 |
| Acid value of urethane resin (II) component | | | 0 | 0 | 0 | 0 | 0 | 0 | 0 | 0 | 0 | 0 | 0 |
| Hydroxy value of urethane resin (II) component | | | 50 | 50 | 50 | 50 | 50 | 50 | 50 | 50 | 30 | 70 | 50 |
| Number average molecular weight of urethane resin (II) component | | | 8000 | 8000 | 8000 | 8000 | 8000 | 8000 | 8000 | 8000 | 5000 | 11500 | 5000 |
| Proportion of urethane resin (II) component (%) | | | 50 | 50 | 50 | 50 | 50 | 50 | 50 | 50 | 30 | 70 | 50 |
| Urethane resin (I) component (total: 100) | OH component | PTMG-1000 | 76.7 | 76.7 | 76.7 | 76.7 | 38.4 | | 76.7 | 81.4 | 78.2 | 73.6 | 73.4 |
| | | PTMG-3000*6 | | | | | 38.3 | | | | | | |
| | | SannixPP-1000*7 | | | | | | 87.2 | | | | | |
| | | ETERNACOLL UH-100 | | | | | | | | | | | |
| | | 1,6-Hexanediol | | | | | | | | | | | |
| | | Trimethylolpropane | | | | | | | | | | | |
| | | Dimethylolpropionic acid | | | | | | | | | | | |
| | NCO component | Isophorone diisocyanate | 22.6 | 22.6 | 22.6 | 22.6 | 22.6 | 12.1 | 22.6 | | 21.2 | 25.2 | 25.4 |
| | | Hexamethylene diisocyanate | | | | | | | | 17.9 | | | |
| | Amine component | Ethylenediamine | 0.8 | 0.8 | 0.8 | 0.8 | 0.8 | 0.8 | 0.8 | 0.8 | 0.5 | 1.2 | 1.2 |
| | | Diethylenetriamine | | | | | | | | | | | |
| | | Hydroxyethylaminoethylamine | | | | | | | | | | | |
| | | 3,5-Dimethylpyrazole | | | | | | | | | | | |
| Acid value of urethane resin (I) component | | | 0 | 0 | 0 | 0 | 0 | 0 | 0 | 0 | 0 | 0 | 0 |
| Hydroxy value of urethane resin (I) component | | | 0 | 0 | 0 | 0 | 0 | 0 | 0 | 0 | 0 | 0 | 0 |
| Number average molecular weight of urethane resin (I) component | | | 8000 | 8000 | 8000 | 8000 | 8000 | 8000 | 8000 | 8000 | 11500 | 5000 | 5000 |
| Proportion of urethane resin (I) component (%) | | | 50 | 50 | 50 | 50 | 50 | 50 | 50 | 50 | 70 | 30 | 50 |
| Solids concentration of urethane resin particles (%) | | | 35 | 35 | 35 | 35 | 35 | 35 | 35 | 35 | 35 | 35 | 35 |
| Average particle size of urethane resin particles (nm) | | | 100 | 120 | 110 | 70 | 90 | 100 | 90 | 110 | 150 | 80 | 100 |
| Acid value of urethane resin particles (mg KOH/g) | | | 17.5 | 17.5 | 17.5 | 17.5 | 17.5 | 17.5 | 17.5 | 17.5 | 17 | 17.5 | 17.5 |
| Hydroxy value of urethane resin particles (mg KOH/g) | | | 0 | 0 | 0 | 0 | 0 | 0 | 0 | 0 | 0 | 0 | 0 |
| Viscosity of urethane resin particles (mPa·s) | | | 50 | 75 | 50 | 220 | 80 | 55 | 80 | 65 | 160 | 50 | 50 |
| Urethane concentration of urethane resin particles (mol/kg) | | | 2.01 | 2.01 | 1.63 | 2.01 | 2.01 | 1.54 | 2.01 | 2.15 | 2.01 | 2.00 | 1.99 |
| Urea concentration of urethane resin particles (mol/kg) | | | 0.13 | 0.13 | 0.13 | 0.13 | 0.13 | 0.13 | 0.13 | 0.12 | 0.12 | 0.12 | 0.21 |
| Number average molecular weight of urethane resin particles | | | 1000000< | ↓ | ↓ | ↓ | ↓ | ↓ | ↓ | ↓ | ↓ | ↓ | ↓ |

TABLE 1-continued

| | Examples | | | | | | | | | | |
|---|---|---|---|---|---|---|---|---|---|---|---|
| | 1A | 2A | 3A | 4A | 5A | 6A | 7A | 8A | 9A | 10A | 11A |
| Flexibility | | 5 | 5 | 4 | 4 | 5 | 5 | 5 | 5 | 4 | 5 |
| 100% modulus (MPa) | 1.9 | 1.1 | 1.4 | 2.5 | 2.4 | 1.5 | 1.2 | 1.4 | 1.1 | 2.9 | 1.8 |
| Tensile stress at break (MPa) | 25 | 13 | 19 | 31 | 27 | 22 | 21 | 15 | 15 | 30 | 27 |
| Tensile elongation at break (%) | 1500 | 2900 | 2200 | 850 | 1200 | 2100 | 2700 | 2300 | 2700 | 900 | 1300 |
| Storage stability | 4 W< | 4 W< | 4 W< | 4 W< | 4 W< | 4 W | 4 W | 4 W< | 3 W | 4 W< | 4 W< |

*[1]UH-100: trade name, produced by Ube Industries, Ltd., 1,6-hexanediol-based polycarbonate diol, molecular weight about 1000
*[2]UH-300: trade name, produced by Ube Industries, Ltd., 1,6-hexanediol-based polycarbonate diol, molecular weight about 3000
*[3]UC-100: trade name, produced by Ube Industries, Ltd., 1,4-cyclohexanedimethanol-based polycarbonate diol, molecular weight about 1000
*[4]PTMG-1000: trade name, produced by Mitsubishi Chemical Corporation, polytetramethylene glycol, molecular weight about 1000
*[5]BES: N,N-bis(2-hydroxyethyl)-2-aminoethanesulfonic acid
*[6]PTMG-3000: trade name, produced by Mitsubishi Chemical Corporation, polytetramethylene glycol, molecular weight about 3000
*[7]PP-1000: trade name, produced by Sanyo Chemical Industries, Ltd., polyoxypropylene glycol, molecular weight about 1000

TABLE 2

| | | | Examples | | | | | | | | | Comparative Example | | |
|---|---|---|---|---|---|---|---|---|---|---|---|---|---|---|
| Urethane resin particle No. | | | 12A | 13A | 14A | 15A | 16A | 17A | 18A | | 1A | 2A | 3A |
| Urethane resin (II) component (total: 100) | OH component | ETERNACOLL UH-100*1 | 62.3 | 69.9 | 67.7 | 50.2 | 64.1 | 62.3 | 33.3 | | 19A Synthesized at one stage | 20A 62.3 | 21A 62.3 |
| | | ETERNACOLL UH-300*2 | | | | | | | | | | | |
| | | ETERNACOLL UC-100*3 | | | | | | | 13.2 | | | | |
| | | PTMG-1000*4 | | | | | | | | | | | |
| | | 1,6-Hexanediol | | 5.1 | | 5.1 | | | | | | | |
| | | Trimethylolpropane | 8.3 | | 8 | 8.4 | 8.3 | 8.3 | 8.3 | | | 8.3 | 8.3 |
| | | Dimethylolpropionic acid | | | | | | | | | | | |
| | | BES*5 | | | | | | | | | | | |
| | NCO component | Hydrogenated MDI | 29.4 | 25.0 | 24.3 | 36.2 | 27.6 | 29.4 | 45.3 | | | 29.4 | 29.4 |
| | | Hexamethylene diisocyanate | | | | | | | | | | | |
| | Acid value of urethane resin (II) component | | 35 | 21 | 21 | 35 | 35 | 35 | 35 | | | 35 | 35 |
| | Hydroxy value of urethane resin (II) component | | 0 | 0 | 0 | 20 | 0 | 0 | 0 | | | 0 | 0 |
| | Number average molecular weight of urethane resin (II) component | | 8000 | 8000 | 8000 | 8000 | 5000 | 8000 | 3000 | | | 8000 | 8000 |
| Proportion of urethane resin (II) component (%) | | | 50 | 50 | 50 | 50 | 50 | 50 | 50 | | | 50 | 50 |
| Urethane resin (I) component (total: 100) | OH component | PTMG-1000 | 76.6 | 76.7 | 76.7 | 66.3 | 72.8 | 75.4 | 32.4 | | 35.6 | 76.7 | 76.7 |
| | | PTMG-3000*6 | | | | | | | | | | | |
| | | SannixPP-1000*7 | | | | | | | | | | | |
| | | ETERNACOLL UH-100 | | | | | | | 15.3 | | 35.6 | | |
| | | 1,6-Hexanediol | | | | 4.9 | | | | | | | |
| | | Trimethylolpropane | | | | | 2.1 | 2.4 | | | 4.2 | | |
| | | Dimethylolpropionic acid | | | | | | | | | | | |
| | NCO component | Isophorone diisocyanate | 22.6 | 22.6 | 22.6 | 28.1 | 25.1 | 22.2 | 50.4 | | 24.2 | 22.6 | 22.6 |
| | | Hexamethylene diisocyanate | | | | | | | | | | | |
| | Amine component | Ethylenediamine | 0.9 | 0.8 | 0.8 | 0.7 | | | 1.9 | | 0.4 | 0.8 | 0.8 |
| | | Diethylenetriamine | | | | | | | | | | | |
| | | Hydroxyethylaminoethylamine | | | | | | | | | | | |
| | | 3,5-Dimethylpyrazole | | | | | 12 | | | | | | |
| | Acid value of urethane resin (I) component | | 0 | 0 | 0 | 0 | 0 | 0 | 0 | | 17.5 | 0 | 0 |
| | Hydroxy value of urethane resin (I) component | | 0 | 0 | 0 | 20 | 5000 | 8000 | 3000 | | 0 | 8000 | 8000 |
| | Number average molecular weight of urethane resin (I) component | | 8000 | 8000 | 8000 | 8000 | 5000 | 8000 | 3000 | | 16000 | 8000 | 8000 |
| Proportion of urethane resin (I) component (%) | | | 50 | 50 | 50 | 50 | 50 | 50 | 50 | | 100 | 50 | 50 |
| Solids concentration of urethane resin particles (%) | | | 35 | 35 | 35 | 35 | 35 | 35 | 30 | | 35 | 35 | 35 |
| Average particle size of urethane resin particles (nm) | | | 100 | 220 | 80 | 120 | 100 | 90 | 60 | | 90 | 210 | 70 |
| Acid value of urethane resin particles (mg KOH/g) | | | 17.5 | 10.5 | 10.5 | 17.5 | 17.5 | 17.5 | 17.5 | | 17.5 | 17.5 | 17.5 |
| Hydroxy value of urethane resin particles (mg KOH/g) | | | 0 | 0 | 0 | 20 | 6 | 0 | 0 | | 0 | 0 | 0 |
| Viscosity of urethane resin particles (mPa·s) | | | 50 | 65 | 150 | 110 | 50 | 70 | 100 | | 120 | 50 | 130 |
| Urethane concentration of urethane resin particles (mol/kg) | | | 2.01 | 1.85 | 1.82 | 2.59 | 1.98 | 2.00 | 3.68 | | 2.05 | 2.01 | 2.01 |
| Urea concentration of urethane resin particles (mol/kg) | | | 0.13 | 0.13 | 0.13 | 0.13 | 0.20 | 0.00 | 0.33 | | 0.13 | 0.13 | 0.13 |
| Number average molecular weight of urethane resin particles | | | 1000000< | ↓ | ↓ | ↓ | ↓ | 16000 | 1000000< | | 1000000< | ↓ | ↓ |

TABLE 2-continued

| | | Examples | | | | | | | Comparative Example | | |
|---|---|---|---|---|---|---|---|---|---|---|---|
| | | 12A | 13A | 14A | 15A | 16A | 17A | 18A | 1A | 2A | 3A |
| Flexibility | | 4 | 5 | 4 | 4 | 5 | 5 | 4 | 4 | 5 | 1 |
| | 100% modulus (MPa) | 2.2 | 1.8 | 2.1 | 2.6 | 1.7 | 0.6 | 3.4 | 2.0 | 0.7 | 5.7 |
| | Tensile stress at break (MPa) | 24 | 24 | 19 | 26 | 24 | — | 30 | 27 | — | 44 |
| | Tensile elongation at break (%) | 1900 | 1800 | 2300 | 1300 | 1800 | 3000< | 950 | 1400 | 3000< | 150 |
| Storage stability | | 4 W< | 3 W | 4 W | 4 W< | 4 W< | 3 W | 4 W< | 2 D | 1 D | 4 W< |

*1UH-100: trade name, produced by Ube Industries, Ltd., 1,6-hexanediol-based polycarbonate diol, molecular weight about 1000
*2UH-300: trade name, produced by Ube Industries, Ltd., 1,6-hexanediol-based polycarbonate diol, molecular weight about 3000
*3UC-100: trade name, produced by Ube Industries, Ltd., 1,4-cyclohexanedimethanol-based polycarbonate diol, molecular weight about 1000
*4PTMG-1000: trade name, produced by Mitsubishi Chemical Corporation, polytetramethylene glycol, molecular weight about 1000
*5BES: N,N-bis(2-hydroxyethyl)-2-aminoethanesulfonic acid
*6PTMG-3000: trade name, produced by Mitsubishi Chemical Corporation, polytetramethylene glycol, molecular weight about 3000
*7PP-1000: trade name, produced by Sanyo Chemical Industries, Ltd., polyoxypropylene glycol, molecular weight about 1000

Preparation of Urethane Resin Particles (A)

Production Example 1

Urethane resin particles Nos. 1A to 21A were obtained by the methods described above in Examples 1A to 18A and Comparative Examples 1A to 3A. Urethane resin particles Nos. 1A to 21A were used as urethane resin particles (A-1) to (A-21) hereinafter.

Production of Reactive Group-Containing Resin (B)

Production of Hydroxy-Containing Polyester Resin (B1)

Production Example 19

174 parts of trimethylolpropane, 327 parts of neopentyl glycol, 352 parts of adipic acid, 109 parts of isophthalic acid, and 101 parts of 1,2-cyclohexanedicarboxylic acid anhydride were placed in a reaction vessel equipped with a thermometer, a thermostat, a stirrer, a reflux condenser, and a water separator. The resulting mixture was heated from 160° C. to 230° C. over a period of 3 hours. Then, while the resulting condensation water was distilled off by using the water separator and the temperature was maintained at 230° C., a reaction was allowed to proceed until an acid value of 3 mg KOH/g or less was achieved. 59 parts of trimellitic anhydride was added to the reaction product, and an addition reaction was conducted at 170° C. for 30 minutes. The resulting product was cooled to 50° C. or lower, and neutralized by adding 2-(dimethylamino)ethanol in an amount of 1 equivalent per equivalent of the acid groups. Deionized water was then gradually added to obtain a hydroxy-containing polyester resin (B1) solution having a solids concentration of 45% and a pH of 7.2. The obtained hydroxy-containing polyester resin had an acid value of 35 mg KOH/g, a hydroxy value of 128 mg KOH/g, and a number average molecular weight of 1,480.

Production of Hydroxy-Containing Acrylic Resin (B2)

Production Example 20

30 parts of propylene glycol monopropyl ether was placed in a reaction vessel equipped with a thermometer, a thermostat, a stirrer, a reflux condenser, a nitrogen inlet tube, and a dropping funnel. After the resulting mixture was heated to 85° C., a mixture of 6 parts of styrene, 30 parts of methyl methacrylate, 25 parts of n-butyl acrylate, 20 parts of 2-ethylhexyl acrylate, 13 parts of 4-hydroxybutyl acrylate, 6 parts of acrylic acid, 10 parts of propylene glycol monopropyl ether, and 2 parts of 2,2'-azobis(2,4-dimethylvaleronitrile) was added dropwise to the flask over a period of 4 hours. After completion of the dropwise addition, the mixture was aged for 1 hour. Subsequently, a mixture of 5 parts of propylene glycol monopropyl ether and 1 part of 2,2'-azobis(2,4-dimethylvaleronitrile) was further added dropwise to the flask over a period of 1 hour. After completion of the dropwise addition, the mixture was aged for 1 hour. 7.4 parts of 2-(dimethylamino)ethanol was further added for neutralization, and deionized water was gradually added to obtain a hydroxy-containing acrylic resin (B2) solution having a solids concentration of 40%. The obtained hydroxy-containing acrylic resin had an acid value of 47 mg KOH/g, a hydroxy value of 51 mg KOH/g, and a weight average molecular weight of 50,000.

Production of Hydroxy-Containing Acrylic Resin (B3)

Production Example 21

145 parts of deionized water and 1.2 parts of Newcol 562SF (see Note 1) were placed in a reaction vessel equipped with a thermometer, a thermostat, a stirrer, a reflux condenser, and a dropping funnel, mixed by stirring in a nitrogen stream, and heated to 80° C. Subsequently, 1% of the total amount of the monomer emulsion 1 described below and 5.2 parts of 3% ammonium persulfate aqueous solution were introduced into the reaction vessel and maintained at 80° C. for 15 minutes. The remaining monomer emulsion 1 was then added dropwise over a period of 3 hours to the reaction vessel. After completion of the dropwise addition, the mixture was aged for 1 hour. Monomer emulsion 2 described below was then added dropwise over a period of 2 hours, and the mixture was aged for 1 hour. Then, while 89 parts of a 1.5% aqueous dimethylethanolamine solution was gradually added to the reaction vessel, the mixture was cooled to 30° C. and filtered through a 100-mesh nylon cloth to obtain a hydroxy-containing acrylic resin (B3) (solids content: 25.2%) having an average particle size of 100 nm, an acid value of 30.7 mg KOH/g, and a hydroxy value of 22.1 mg KOH/g.

Note 1: Newcol 562SF: produced by Nippon Nyukazai Co., Ltd., trade name, ammonium polyoxyethylene alkylbenzene sulfonate, active ingredient: 60%

Monomer emulsion 1: 94.3 parts of deionized water, 17 parts of methyl methacrylate, 80 parts of n-butyl acrylate, 3 parts of allyl methacrylate, and 1.2 parts of Newcol 562SF were mixed by stirring to obtain monomer emulsion 1.

Monomer emulsion 2: 39 parts of deionized water, 15.4 parts of methyl methacrylate, 2.9 parts of n-butyl acrylate, 5.9 parts of hydroxyethyl acrylate, 5.1 parts of methacrylic acid, and 0.5 parts of Newcol 562SF were mixed by stirring to obtain monomer emulsion 2.

Production of Aqueous Coating Composition (Aqueous Intermediate Coating Composition)

Example 1B 56 parts of the hydroxy-containing polyester resin (B1) solution obtained in Production Example 19 (resin solids: 25 parts), 60 parts of JR-806 (trade name, produced by Tayca Corporation, rutile titanium dioxide), 1 part of Carbon MA-100 (trade name, produced by Mitsubishi Chemical Corporation, carbon black), 15 parts of Bariace B-35 (trade name, produced by Sakai Chemical Industry Co., Ltd., barium sulfate powder, average primary particle size: 0.5 μm), 3 parts of MICRO ACE S-3 (trade name, produced by Nippon Talc Co., Ltd., talc powder, average primary particle size: 4.8 μm), and 5 parts of deionized water were mixed. The mixture was adjusted to a pH of 8.0 with 2-(dimethylamino)ethanol, and then dispersed using a paint shaker for 30 minutes to obtain a pigment dispersion paste.

Subsequently, 140 parts of the obtained pigment dispersion paste, 29 parts of the hydroxy-containing polyester resin (B1) solution obtained in Production Example 19 (resin solids: 13 parts), 25 parts of the hydroxy-containing acrylic resin (B2) solution obtained in Production Example 20 (resin solids: 10 parts), 30 parts of melamine resin (C1)

(methyl-butyl mixed etherified melamine resin, solids content: 80%, weight average molecular weight: 800) (resin solids: 24 parts), 21 parts of Bayhydur VPLS2310 (trade name, produced by Sumika Bayer Urethane Co., Ltd., an oxime blocked polyisocyanate compound, solids content: 38%) (resin solids: 8 parts), and 57 parts of the aqueous dispersion of the urethane resin particles (A-1) obtained in Production Example 1 (resin solids: 20 parts) were uniformly mixed.

Subsequently, UH-752 (trade name, produced by Adeka Co., Ltd., a urethane associative thickener), 2-(dimethylamino)ethanol, and deionized water were added to the resulting mixture to obtain an aqueous intermediate coating composition No. 1B having a pH of 8.0, a solids concentration of 48%, and a viscosity of 30 seconds as measured with Ford cup No. 4 at 20° C.

Examples 2B to 20B and Comparative Examples 1B to 3B

Aqueous intermediate coating compositions Nos. 2B to 23B were obtained in the same manner as in Example 1B, except that the formulations shown in Tables 3 and 4 below were used. The compositions had a pH of 8.0, a solids concentration of 48 mass %, and a viscosity of 30 seconds as measured with Ford cup No. 4 at 20° C.

The aqueous intermediate coating compositions Nos. 21B to 23B are for use in Comparative Examples.

TABLE 3

|  |  |  | Examples |||||||||||| 
|---|---|---|---|---|---|---|---|---|---|---|---|---|---|
|  |  |  | 1B | 2B | 3B | 4B | 5B | 6B | 7B | 8B | 9B | 10B | 11B | 12B |
| Aqueous intermediate coating composition No. |  |  | 1B | 2B | 3B | 4B | 5B | 6B | 7B | 8B | 9B | 10B | 11B | 12B |
| Pigment paste | Hydroxy-containing polyester resin (B1) solution |  | 56 | 56 | 56 | 56 | 56 | 56 | 56 | 56 | 56 | 56 | 56 | 56 |
|  | Pigments | Coloring pigments | JR-806 | 60 | 60 | 60 | 60 | 60 | 60 | 60 | 60 | 60 | 60 | 60 | 60 |
|  |  |  | MA-100 | 1 | 1 | 1 | 1 | 1 | 1 | 1 | 1 | 1 | 1 | 1 | 1 |
|  |  | Extender pigments | Bariace B-35 | 15 | 15 | 15 | 15 | 15 | 15 | 15 | 15 | 15 | 15 | 15 | 15 |
|  |  |  | MICRO ACE S-3 | 3 | 3 | 3 | 3 | 3 | 3 | 3 | 3 | 3 | 3 | 3 | 3 |
| Reactive group-containing resin (B) | Hydroxy-containing polyester resin (B1) solution |  | 29 | 29 | 29 | 29 | 29 | 29 | 29 | 29 | 29 | 29 | 29 | 29 |
|  | Hydroxy-containing acrylic resin (B2) solution |  | 25 | 25 | 25 | 25 | 25 | 25 | 25 | 25 | 25 | 25 | 25 | 25 |
| Crosslinking agent (C) | Melamine resin (C1) |  | 30 |  | 40 | 30 | 30 | 30 | 30 | 30 | 30 | 30 | 30 | 30 |
|  | Blocked polyisocyanate compound | Bayhydur VPLS2310 | 21 | 84 |  | 21 | 21 | 21 | 21 | 21 | 21 | 21 | 21 | 21 |
| Aqueous dispersion of urethane resin particles (A-) | No. |  | 1 | 1 | 1 | 2 | 3 | 4 | 5 | 6 | 7 | 8 | 9 | 10 |
|  | Amount |  | 57 | 57 | 57 | 57 | 57 | 57 | 57 | 57 | 57 | 57 | 57 | 57 |

TABLE 4

|  |  |  | Examples |||||||| Comparative Examples |||
|---|---|---|---|---|---|---|---|---|---|---|---|---|---|
|  |  |  | 13B | 14B | 15B | 16B | 17B | 18B | 19B | 20B | 1B | 2B | 3B |
| Aqueous intermediate coating composition No. |  |  | 13B | 14B | 15B | 16B | 17B | 18B | 19B | 20B | 21B | 22B | 23B |
| Pigment paste | Hydroxy-containing polyester resin (B1) solution |  | 56 | 56 | 56 | 56 | 56 | 56 | 56 | 56 | 56 | 56 | 56 |
|  | Pigments | Coloring pigments | JR-806 | 60 | 60 | 60 | 60 | 60 | 60 | 60 | 60 | 60 | 60 | 60 |
|  |  |  | MA-100 | 1 | 1 | 1 | 1 | 1 | 1 | 1 | 1 | 1 | 1 | 1 |
|  |  | Extender pigments | Bariace B-35 | 15 | 15 | 15 | 15 | 15 | 15 | 15 | 15 | 15 | 15 | 15 |
|  |  |  | MICRO ACE S-3 | 3 | 3 | 3 | 3 | 3 | 3 | 3 | 3 | 3 | 3 | 3 |
| Reactive group-containing resin (B) | Hydroxy-containing polyester resin (B1) solution |  | 29 | 29 | 29 | 29 | 29 | 29 | 29 | 29 | 29 | 29 | 29 |
|  | Hydroxy-containing acrylic resin (B2) solution |  | 25 | 25 | 25 | 25 | 25 | 25 | 25 | 25 | 25 | 25 | 25 |
| Crosslinking agent (C) | Melamine resin (C1) |  | 30 | 30 | 30 | 30 | 30 | 30 | 30 | 30 | 30 | 30 | 30 |
|  | Blocked polyisocyanate compound | Bayhydur VPLS2310 | 21 | 21 | 21 | 21 | 21 | 21 | 21 | 21 | 21 | 21 | 21 |
| Aqueous dispersion of urethane resin particles (A-) | No. |  | 11 | 12 | 13 | 14 | 15 | 16 | 17 | 18 | 19 | 20 | 21 |
|  | Amount |  | 57 | 57 | 57 | 57 | 57 | 57 | 57 | 57 | 57 | 57 | 57 |

Examples 21B to 40B and Comparative Examples 4B to 6B

Aqueous intermediate coating compositions Nos. 1B to 23B obtained in Examples 1B to 20B and Comparative Examples 1B to 3B were subjected to the following evaluation tests. Tables 5 and 6 show the following evaluation results.

Test plates were prepared as described below, and chipping resistance and finished appearance (smoothness and distinctness of image) were evaluated.

Preparation of Test Substrates

"Electron GT-10" (trade name, produced by Kansai Paint Co., Ltd., a cationic electrodeposition coating composition) was applied to zinc phosphated cold-rolled steel plates by electrodeposition to a film thickness of 20 μm (when dried), and cured by heating at 170° C. for 30 minutes to prepare test substrates.

Production of Test Plate

The aqueous intermediate coating compositions were electrostatically applied to the test substrates to a film thickness of 30 μm (when cured) using a rotary atomizing electrostatic coating apparatus, and allowed to stand for 5 minutes. After preheating at 80° C. for 3 minutes, heating was performed at 140° C. for 30 minutes to form an intermediate coating film. WBC-713T No. 1F7 (trade name, produced by Kansai Paint Co., Ltd., an acrylic melamine resin-based aqueous base coating composition, coating color: silver) was further electrostatically applied to the intermediate coating film to a film thickness of 15 μm (when cured) using a rotary atomizing electrostatic coating apparatus to form a base coating film. After the thus-coated substrates were allowed to stand for 3 minutes and then preheated at 80° C. for 3 minutes, Magicron KINO-1210 (trade name, produced by Kansai Paint Co., Ltd., an acrylic resin solvent-based top clear coating composition) was electrostatically applied to the uncured base coating film to a film thickness of 35 μm (when cured) to form a clear coating film. The thus-coated substrates were allowed to stand for 7 minutes and then heated at 140° C. for 30 minutes to simultaneously cure the base coating film and the clear coating film, thus preparing test plates.

Chipping resistance: Each test plate was placed on a sample holder of a "JA-400" flying stone chipping tester (a chipping test device) produced by Suga Test Instruments Co., Ltd. 100 g of crushed granite with a grain size of No. 6 was blown onto the test plate at an angle of 45° with compressed air of 0.392 MPa (4 kgf/cm$^2$), at a distance of 30 cm from the test plate and at a temperature of −20° C. Subsequently, the resulting test plate was washed with water and dried, and cloth adhesive tape (produced by Nichiban Co., Ltd.) was applied to the coating surface. After peeling off the tape, the occurrence of scratches formed on the coating film was visually observed and evaluated according to the following criteria.

S: The scratch size was extremely small, and the electrodeposition surface and the substrate steel plate were not exposed.

A: The scratch size was small, and the electrodeposition surface and the substrate steel plate were not exposed.

B: The scratch size was small, but the electrodeposition surface and/or the substrate steel plate were exposed.

C: The scratch size was considerably large, and the substrate steel plate was also greatly exposed.

Smoothness: Smoothness was evaluated based on We value measured using Wave Scan DOI (trade name, produced by BYK Gardner). The We value is an index of the amplitude of surface roughness at a wavelength of about 1 to 3 mm. A smaller We value indicates a greater smoothness of the coated surface.

Distinctness of image: Distinctness of image was evaluated based on Wb value measured using Wave Scan DOI (trade name, produced by BYK Gardner). The Wb value is an index of the amplitude of surface roughness at a wavelength of about 0.3 to 1 mm. A smaller Wb value indicates a higher distinctness of image of the coated surface.

Further, using the aqueous intermediate coating compositions after storage, test plates were produced in the same manner as above, and the distinctness of image was evaluated.

The term "Initial" in the table indicates the distinctness of image when the aqueous intermediate coating compositions were applied immediately after the production thereof, and the term "After storage" indicates the distinctness of image when the aqueous intermediate coating compositions were applied after they were stored at 30° C. for 30 days after the production.

TABLE 5

| | | Examples | | | | | | | | | | | |
| --- | --- | --- | --- | --- | --- | --- | --- | --- | --- | --- | --- | --- | --- |
| | | 21B | 22B | 23B | 24B | 25B | 26B | 27B | 28B | 29B | 30B | 31B | 32B |
| Aqueous intermediate coating composition No. | | 1B | 2B | 3B | 4B | 5B | 6B | 7B | 8B | 9B | 10B | 11B | 12B |
| Chipping resistance | | S | S | A | S | A | A | S | S | S | S | S | A |
| Smoothness | | 8.0 | 8.3 | 9.1 | 7.9 | 9.1 | 9.2 | 8.2 | 8.6 | 9.4 | 7.8 | 7.1 | 9.4 |
| Distinctness of image | Initial | 14.9 | 14.8 | 15.9 | 14.7 | 15.6 | 14.3 | 14.8 | 15.0 | 16.2 | 16.4 | 14.3 | 16.6 |
| | After storage | 15.3 | 15.2 | 15.8 | 15.7 | 15.6 | 15.1 | 16.1 | 15.2 | 15.7 | 16.6 | 14.6 | 16.9 |

TABLE 6

| | Examples | | | | | | | | Comparative Examples | | |
| --- | --- | --- | --- | --- | --- | --- | --- | --- | --- | --- | --- |
| | 33B | 34B | 35B | 36B | 37B | 38B | 39B | 40B | 4B | 5B | 6B |
| Aqueous intermediate coating composition No. | 13B | 14B | 15B | 16B | 17B | 18B | 19B | 20B | 21B | 22B | 23B |
| Chipping resistance | S | S | S | S | S | S | S | S | A | S | C |

TABLE 6-continued

|  |  | Examples | | | | | | | | Comparative Examples | | |
| --- | --- | --- | --- | --- | --- | --- | --- | --- | --- | --- | --- | --- |
|  |  | 33B | 34B | 35B | 36B | 37B | 38B | 39B | 40B | 4B | 5B | 6B |
| Smoothness |  | 8.3 | 8.5 | 7.8 | 8.8 | 8.4 | 9.1 | 7.6 | 9.4 | 12.0 | 15.0 | 15.0 |
| Distinctness | Initial | 14.1 | 15.0 | 15.1 | 15.5 | 14.8 | 15.0 | 15.9 | 16.4 | 18.0 | 20.0 | 20.4 |
| of image | After storage | 15.1 | 15.2 | 16.2 | 15.9 | 16 | 15.6 | 16.4 | 16.5 | 50.0 | 52 | 23.5 |

Examples 41B to 61B and Comparative Examples 7B to 9B

Test plates were prepared in the same manner as in Examples 21B to 40B and Comparative Examples 4B to 6B except that the test plates were prepared as described below in Preparation of Test Plates, and their chipping resistance and finished appearance (smoothness and distinctness of image) were evaluated in the same manner. Tables 7 and 8 show the evaluation results.

Preparation of Test Plates

The aqueous intermediate coating compositions were individually electrostatically applied to the test substrates to a film thickness of 20 μm (when cured) using a rotary atomizing electrostatic coating apparatus, allowed to stand for 5 minutes, and then preheated at 80° C. for 3 minutes. Subsequently, WBC-713T No. 1F7 (trade name, produced by Kansai Paint Co., Ltd., an acrylic melamine resin-based aqueous base coating composition, coating color: silver) was electrostatically applied to the uncured intermediate coating film to a film thickness of 15 μm (when cured) using a rotary atomizing electrostatic coating apparatus, allowed to stand for 5 minutes, and then preheated at 80° C. for 3 minutes.

Subsequently, Magicron KINO-1210 (trade name, produced by Kansai Paint Co., Ltd., an acrylic resin solvent-based top clear coating composition) was electrostatically applied to the uncured base coating film to a film thickness of 35 μm (when cured). The thus-coated substrates were allowed to stand for 7 minutes and then heated at 140° C. for 30 minutes to simultaneously cure the base coating film and the clear coating film, thus preparing test plates.

In Example 61B, test plates were prepared in the same manner as in Example 41B, except that an aqueous base coating composition No. 1B of Example 62B described below was used as a base coating composition in place of "WBC-713T No. 1F7."

TABLE 7

|  |  | Examples | | | | | | | | | | | |
| --- | --- | --- | --- | --- | --- | --- | --- | --- | --- | --- | --- | --- | --- |
|  |  | 41B | 42B | 43B | 44B | 45B | 46B | 47B | 48B | 49B | 50B | 51B | 52B |
| Aqueous intermediate coating composition No. |  | 1B | 2B | 3B | 4B | 5B | 6B | 7B | 8B | 9B | 10B | 11B | 12B |
| Chipping resistance |  | S | S | A | S | A | A | S | S | S | S | S | A |
| Smoothness |  | 11.1 | 11.8 | 12 | 10.9 | 12 | 9.8 | 10.5 | 11.9 | 11.3 | 12.1 | 10.9 | 11.6 |
| Distinctness | Initial | 17.5 | 16.5 | 18.8 | 17.8 | 17.9 | 18.2 | 17.2 | 17.4 | 17.8 | 18.4 | 18.2 | 17.7 |
| of image | After storage | 17.4 | 17.1 | 18.6 | 18.1 | 18.6 | 18.4 | 17.6 | 17.8 | 17.1 | 18.7 | 18.4 | 19.1 |

TABLE 8

|  |  | Examples | | | | | | | | | Comparative Examples | | |
| --- | --- | --- | --- | --- | --- | --- | --- | --- | --- | --- | --- | --- | --- |
|  |  | 53B | 54B | 55B | 56B | 57B | 58B | 59B | 60B | 61B | 7B | 8B | 9B |
| Aqueous intermediate coating composition No. |  | 13B | 14B | 15B | 16B | 17B | 18B | 19B | 20B | 1B | 21B | 22B | 23B |
| Chipping resistance |  | S | S | S | S | S | S | S | S | S | A | S | C |
| Smoothness |  | 11.1 | 10.4 | 9.1 | 10 | 11.8 | 11.1 | 11.4 | 11.2 | 9.4 | 18 | 18 | 20 |
| Distinctness | Initial | 17.8 | 17.7 | 18.4 | 17.9 | 17.4 | 18.3 | 16.9 | 17.5 | 16.8 | 22.2 | 21.1 | 26 |
| of image | After storage | 18.8 | 17.7 | 19.4 | 18.1 | 19.5 | 19.1 | 18.1 | 18.8 | 17.3 | 55.2 | 56.1 | 28.1 |

Preparation of Aqueous Coating Composition (Aqueous Base Coating Composition)

Example 62B

While stirring, 37.5 parts of Cymel 325 (produced by Nihon Cytec Industries Inc., a methyl-butyl mixed etherified melamine resin, solids content: 80%), 79.4 parts (resin solids: 20 parts) of the hydroxy-containing acrylic resin (B3) obtained in Production Example 21 (solids content: 25.2%), and 57 parts (resin solids: 20 parts) of the aqueous dispersion of the acrylic urethane composite resin particles No. 1B obtained in Production Example 1 (resin solids: 20 parts) were uniformly mixed with 66.7 parts (resin solids: 30 parts) of the hydroxy-containing polyester resin (B1) solution obtained in Production Example 19.

While stirring, aluminum paste GX180A (produced by Asahi Kasei Corporation, an aluminum flake paste) was then added in an amount such that the amount of aluminum pigment component was 20 parts, and the resulting mixture was mixed and dispersed. Further, Primal ASE-60 (produced by Rohm and Haas, an acrylic emulsion-type alkali thickener), dimethylethanolamine, and deionized water were added to obtain an aqueous base coating composition No. 1B having a pH of 8.0, a solids concentration of 25 mass %, and a viscosity of 40 seconds as measured with Ford cup No. 4 at 20° C.

Examples 63B to 80B and Comparative Examples 10B to 12B

Aqueous base coating compositions Nos. 2B to 22B were obtained in the same manner as in Example 62B, except that the formulations shown in Tables 9 and 10 below were used. The compositions had a pH of 8.0, a solids concentration of 25 mass %, and a viscosity of 40 seconds as measured with Ford cup No. 4 at 20° C.

Aqueous base coat compositions Nos. 20B to 22B are for use in Comparative Examples.

Bayhydur VPLS2310 in Table 9 is a blocked polyisocyanate compound (trade name, produced by Sumika Bayer Urethane Co., Ltd., solids content: 38%).

TABLE 9

| | | | Examples | | | | | | | | | | |
|---|---|---|---|---|---|---|---|---|---|---|---|---|---|
| | | | 62B | 63B | 64B | 65B | 66B | 67B | 68B | 69B | 70B | 71B | 72B |
| Aqueous topcoat base coating composition No. | | | 1B | 2B | 3B | 4B | 5B | 6B | 7B | 8B | 9B | 10B | 11B |
| Reactive group-containing resin (B) | Hydroxy-containing polyester resin (B1) solution | | 66.7 | 66.7 | 66.7 | 66.7 | 66.7 | 66.7 | 66.7 | 66.7 | 66.7 | 66.7 | 66.7 |
| | Hydroxy-containing acrylic resin (B3) solution | | 79.4 | 79.4 | 79.4 | 79.4 | 79.4 | 79.4 | 79.4 | 79.4 | 79.4 | 79.4 | 79.4 |
| Crosslinking agent (C) | Cymel 325 | | 37.5 | | 37.5 | 37.5 | 37.5 | 37.5 | 37.5 | 37.5 | 37.5 | 37.5 | 37.5 |
| | Blocked polyisocyanate compound | Bayhydur VPLS2310 | | 78.9 | | | | | | | | | |
| Aqueous dispersion of urethane resin particles (A-) | | No. | 1 | 1 | 2 | 3 | 4 | 5 | 6 | 7 | 8 | 9 | 10 |
| | | Amount | 57 | 57 | 57 | 57 | 57 | 57 | 51 | 57 | 57 | 57 | 57 |
| GX180A | | | 20 | 20 | 20 | 20 | 20 | 20 | 20 | 20 | 20 | 20 | 20 |

TABLE 10

| | | | Examples | | | | | | | | Comparative Examples | | |
|---|---|---|---|---|---|---|---|---|---|---|---|---|---|
| | | | 73B | 74B | 75B | 76B | 77B | 78B | 79B | 80B | 10B | 11B | 12B |
| Aqueous topcoat base coating composition No. | | | 12B | 13B | 14B | 15B | 16B | 17B | 18B | 19B | 20B | 21B | 22B |
| Reactive group-containing resin (B) | Hydroxy-containing polyester resin (B1) solution | | 66.7 | 66.7 | 66.7 | 66.7 | 66.7 | 66.7 | 66.7 | 66.7 | 66.7 | 66.7 | 66.7 |
| | Hydroxy-containing acrylic resin (B3) solution | | 79.4 | 79.4 | 79.4 | 79.4 | 79.4 | 79.4 | 79.4 | 79.4 | 79.4 | 79.4 | 79.4 |
| Crosslinking agent (C) | Cymel 325 | | 37.5 | 37.5 | 37.5 | 37.5 | 37.5 | 37.5 | 37.5 | 37.5 | 37.5 | 37.5 | 37.5 |
| Aqueous dispersion of urethane resin particles (A-) | | No. | 11 | 12 | 13 | 14 | 15 | 16 | 17 | 18 | 19 | 20 | 21 |
| | | Amount | 57 | 57 | 57 | 57 | 57 | 57 | 57 | 57 | 57 | 57 | 57 |
| GX180A | | | 20 | 20 | 20 | 20 | 20 | 20 | 20 | 20 | 20 | 20 | 20 |

Examples 81B to 99B and Comparative Examples 13B to 15B

Aqueous base coating compositions Nos. 1 to 22B obtained in Examples 62B to 80B and Comparative Examples 10B to 12B were subjected to the following evaluation tests. Test plates were prepared in the same manner as in Examples 21B to 40B and Comparative Examples 4B to 6B except that test plates were prepared as described below in Preparation of Test Plates, and their chipping resistance and finished appearance (smoothness and distinctness of image) were evaluated in the same manner. Tables 11 and 12 show the evaluation results. Further, the distinctness of image after storage was evaluated by preparing test plates in the same manner as above, except that the aqueous base coating compositions after storage were used.

Preparation of Test Plates

"WP-306T" (trade name, produced by Kansai Paint Co., Ltd., a polyester melamine resin-based aqueous intermediate coating composition) was electrostatically applied to the test substrates to a film thickness of 30 μm (when cured) using a rotary atomizing electrostatic coating apparatus. After the thus-coated substrates were allowed to stand for 5 minutes and preheated at 80° C. for 3 minutes, heating was performed at 140° C. for 30 minutes to form an intermediate coating film. Each aqueous base coating composition was further electrostatically applied to the intermediate coating film to a film thickness of 15 μm (when cured) using a rotary atomizing electrostatic coating apparatus to form a base coating film. After the thus-coated substrates were then allowed to stand for 3 minutes and preheated at 80° C. for 3 minutes, Magicron KINO-1210 (trade name, produced by Kansai Paint Co., Ltd., an acrylic resin solvent-based top clear coating composition) was electrostatically applied to the uncured base coating film to a film thickness of 35 μm (when cured) to form a clear coating film. The thus-coated substrates were allowed to stand for 7 minutes and then heated at 140° C. for 30 minutes to simultaneously cure the base coating film and the clear coating film, thus preparing test plates.

TABLE 11

| | | Examples | | | | | | | | | | |
|---|---|---|---|---|---|---|---|---|---|---|---|---|
| | | 81B | 82B | 83B | 84B | 85B | 86B | 87B | 88B | 89B | 90B | 91B |
| Aqueous topcoat base coating composition No. | | 1B | 2B | 3B | 4B | 5B | 6B | 7B | 8B | 9B | 10B | 11B |
| Chipping resistance | | S | S | S | S | S | S | S | S | S | S | S |
| Smoothness | | 8.4 | 8.6 | 9.1 | 9.9 | 8.6 | 9.6 | 9.6 | 9.1 | 9.6 | 9.7 | 9.4 |
| Distinctness of image | Initial | 14.3 | 13.9 | 14.6 | 14.4 | 15.4 | 14.8 | 15.8 | 14.6 | 14.7 | 15.5 | 15.1 |
| | After storage | 14.9 | 14.9 | 15.9 | 14.6 | 15.2 | 15.9 | 16.1 | 14.7 | 15.6 | 14.9 | 15.9 |

TABLE 12

| | | Examples | | | | | | | | Comparative Example | | |
|---|---|---|---|---|---|---|---|---|---|---|---|---|
| | | 92B | 93B | 94B | 95B | 96B | 97B | 98B | 99B | 13B | 14B | 15B |
| Aqueous topcoat base coating composition No. | | 12B | 13B | 14B | 15B | 16B | 17B | 18B | 19B | 20B | 21B | 22B |
| Chipping resistance | | S | S | S | S | S | S | S | S | S | S | C |
| Smoothness | | 8.4 | 8.8 | 9.1 | 8.4 | 9.4 | 8.7 | 8.3 | 9.1 | 12.3 | 14.3 | 14.5 |
| Distinctness of image | Initial | 14.2 | 15.3 | 13.9 | 14.4 | 14.9 | 14.1 | 15.2 | 13.9 | 17.6 | 19.2 | 20.1 |
| | After storage | 15.4 | 15.3 | 14.9 | 15.2 | 16.0 | 15.2 | 15.6 | 15.4 | 40.1 | 44.3 | 22.1 |

Examples 100B to 119B and Comparative Examples 16B to 18B

Test plates were prepared in the same manner as in Examples 81B to 99B and Comparative Examples 13B to 15B except that test plates were prepared as described below in Preparation of Test Plates, and their chipping resistance and finished appearance (smoothness and distinctness of image) were evaluated in the same manner. Tables 13 and 14 show the evaluation results.

Preparation of Test Plates

An aqueous intermediate coating composition A (*see below) was electrostatically applied to the test substrates to a film thickness of 20 μm (when cured) using a rotary atomizing electrostatic coating apparatus. After the coated substrates were allowed to stand for 5 minutes and preheated at 80° C. for 3 minutes, the aqueous base coating compositions were electrostatically applied to the uncured intermediate coating film to a film thickness of 15 μm (when cured) using a rotary electrostatic spray coater. The coated substrates were allowed to stand for 3 minutes, and then preheated at 80° C. for 3 minutes.

Subsequently, Magicron KINO-1210 (trade name, produced by Kansai Paint Co., Ltd., an acrylic resin solvent-based top clear coating composition) was electrostatically applied to the uncured base coating film to a film thickness of 35 μm (when cured). The thus-coated substrates were allowed to stand for 7 minutes, and then heated at 140° C. for 30 minutes to cure the multilayer coating films each comprising an intermediate coating film, a base coating film, and a clear coating film, thus producing test plates.

In Example 119B, test plates were prepared in the same manner as in Example 100B, except that the aqueous intermediate coating composition No. 1B of Example 1B was used in place of WP-306T as an aqueous intermediate coating composition.

(*) Aqueous Intermediate Coating Composition A 51 parts of a hydroxy-containing acrylic resin solution (a) (resin solids content: 20.4 parts), 87 parts of rutile titanium dioxide (trade name JR-806, produced by Tayca Corporation), 0.8 parts of carbon black (trade name: Carbon Ma-100, produced by Mitsubishi Chemical, Inc.), and 50 parts of deionized water were mixed and adjusted to a pH of 8.0 with 2-(dimethylamino)ethanol. The resulting mixture was then dispersed with a paint shaker for 30 minutes to obtain a pigment-dispersed paste.

Subsequently, 189 parts of the obtained pigment-dispersed paste, 83.3 parts of a hydroxy-containing acrylic resin dispersion (b), 75 parts of a urethane resin emulsion (trade name U-Coat UX-485, a polycarbonate-based urethane resin emulsion, solids content: 40%, produced by Sanyo Chemical Industries, Ltd.), and 35.7 parts of a melamine resin (a methyl etherified melamine resin, weight average molecular weight: 800, solids content: 70%) were uniformly mixed.

Subsequently, ASE-60 (an alkaline swelling thickener, trade name, produced by Rohm & Haas Co.), 2-(dimethylamino)ethanol, and deionized water were added to the obtained mixture to obtain an aqueous intermediate coating composition A with a pH of 8.2, a coating solids content of 44%, and a viscosity of 30 seconds as measured at 20° C. using a No. 4 Ford cup.

Hydroxy-Containing Acrylic Resin Solution (a):

30 parts of propylene glycol monopropyl ether was placed in a reaction vessel equipped with a thermometer, a thermostat, a stirrer, a reflux condenser, a nitrogen inlet tube, and a dropping funnel, and heated to 85° C. A mixture of 10 parts of styrene, 30 parts of methyl methacrylate, 15 parts of 2-ethylhexyl acrylate, 11.5 parts of n-butyl acrylate, 30 parts of hydroxyethyl acrylate, 3.5 parts of acrylic acid, 10 parts of propylene glycol monopropyl ether, and 2 parts of 2,2'-azobis(2,4-dimethylvaleronitrile) was then added dropwise over a period of 4 hours. After completion of the addition, the resulting mixture was aged for 1 hour. Further, a mixture of 5 parts of propylene glycol monopropyl ether and 1 part of 2,2'-azobis(2,4-dimethylvaleronitrile) was then added dropwise to the flask over 1 hour. After completion of the addition, the resulting mixture was aged for 1 hour. Further, 3.03 parts of 2-(dimethylamino)ethanol was added, and deionized water was gradually added to obtain a hydroxy-containing acrylic resin solution (a) with a solids concentration of 40%. The obtained hydroxy-containing acrylic resin had an acid value of 27 mg KOH/g and a hydroxy value of 145 mg KOH/g.

Hydroxy-Containing Acrylic Resin Dispersion (b):

130 parts of deionized water and 0.52 parts of Aqualon KH-10 (trade name, produced by Dai-ichi Kogyo Seiyaku Co., Ltd., an ammonium salt of polyoxyethylene alkyl ether sulfate ester, active ingredient: 97%) were placed in a reaction vessel equipped with a thermometer, a thermostat, a stirrer, a reflux condenser, a nitrogen inlet tube, and a dropping funnel. The mixture was stirred and mixed in a nitrogen stream, and heated to 80° C. Subsequently, 1% of the total amount of a monomer emulsion (1) described below and 5.3 parts of a 6% ammonium persulfate aqueous solution were introduced into the reaction vessel, and maintained at 80° C. for 15 minutes. The remaining monomer emulsion (1) was then added dropwise to the reaction vessel over a period of 3 hours while the reaction vessel was maintained at the same temperature. After completion of the dropwise addition, the mixture was aged for 1 hour.

Subsequently, a monomer emulsion (2) described below was added dropwise over 1 hour, and the resulting mixture was aged for 1 hour. Then, while 40 parts of a 5% aqueous 2-(dimethylamino)ethanol solution was gradually added to the reaction vessel, the mixture was cooled to 30° C. and filtered through a 100-mesh nylon cloth to obtain as the filtrate a hydroxy-containing acrylic resin dispersion (b) having a solids concentration of 30% and an average particle size of 108 nm (as measured at 20° C. using a "COULTER N4" submicron particle size distribution analyzer (produced by Beckman Coulter, Inc.) in a state diluted with deionized water). The obtained hydroxy-containing acrylic resin had an acid value of 33 mg KOH/g and a hydroxy value of 25 mg KOH/g.

Monomer emulsion (1): 42 parts of deionized water, 0.72 parts of Aqualon KH-10, 2.1 parts of methylene bisacrylamide, 2.8 parts of styrene, 16.1 parts of methyl methacrylate, 38 parts of ethyl acrylate, and 11 parts of n-butyl acrylate were mixed and stirred to obtain a monomer emulsion (1).

Monomer emulsion (2): 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, and 10.8 parts of n-butyl acrylate were mixed and stirred to obtain a monomer emulsion (2).

TABLE 13

| | | Examples | | | | | | | | | | |
|---|---|---|---|---|---|---|---|---|---|---|---|---|
| | | 100B | 101B | 102B | 103B | 104B | 105B | 106B | 107B | 108B | 109B | 110B |
| Aqueous topcoat base coating composition No. | | 1B | 2B | 3B | 4B | 5B | 6B | 7B | 8B | 9B | 10B | 11B |
| Chipping resistance | | S | S | S | S | S | S | S | S | S | S | S |
| Smoothness | | 11.4 | 12.1 | 11.9 | 12.8 | 10.2 | 11.4 | 12.1 | 11.8 | 12.9 | 11.6 | 12.1 |
| Distinctness of image | Initial | 17.8 | 17.9 | 17.2 | 18.2 | 17.4 | 17.7 | 18.4 | 18.3 | 18.4 | 17.7 | 17.9 |
| | After storage | 18.6 | 18.9 | 17.9 | 18.4 | 17.8 | 18.1 | 18.5 | 18.6 | 18.9 | 18.9 | 18.5 |

TABLE 14

| | | Examples | | | | | | | | | Comparative Example | | |
|---|---|---|---|---|---|---|---|---|---|---|---|---|---|
| | | 111B | 112B | 113B | 114B | 115B | 116B | 117B | 118B | 119B | 16B | 17B | 18B |
| Aqueous topcoat base coating composition No. | | 12B | 13B | 14B | 15B | 16B | 17B | 18B | 19B | 1B | 20B | 21B | 22B |
| Chipping resistance | | S | S | S | S | S | S | S | S | S | S | S | C |
| Smoothness | | 12.4 | 11.4 | 10.9 | 12.5 | 12.6 | 12.3 | 12.4 | 12.2 | 9.0 | 17.4 | 18.5 | 20.4 |
| Distinctness of image | Initial | 16.9 | 17.5 | 17.4 | 17.4 | 18.4 | 18.3 | 17.9 | 18.6 | 16.0 | 22.4 | 23.5 | 21.1 |
| | After storage | 17.5 | 17.9 | 18.1 | 18.2 | 18.9 | 18.4 | 18.5 | 18.4 | 16.8 | 46.5 | 48.5 | 25.6 |

Production of Aqueous Coating Compositions
(Aqueous Primer Coating Compositions)

Example 120B 30 parts by mass of an aqueous chlorinated polypropylene (an aqueous dispersion of maleic acid-modified, chlorinated polypropylene having a chlorine content of 22% and an acid value due to modification with maleic acid of 35 mg KOH/g), 5 parts by mass of a hydroxy-containing acrylic emulsion (c), 30 parts by mass of the aqueous dispersion of urethane resin particles (A-1) obtained in Production Example 1, 15 parts by mass of a hydroxy-containing acrylic resin solution (d), 10 parts by mass of a polyester resin (e), 10 parts by mass of MFK-60X (produced by Asahi Chemical Industry Co., Ltd., trade name, an adduct of active methylene to polyisocyanate), all on a solids basis, 100 parts of JR-806 (produced by Tayca Corporation, trade name, titanium white), and 5 parts of Ketjen Black EC600J (produced by Lion Akzo Co., Ltd., trade name, a conductive carbon black pigment) were blended, mixed, and dispersed by usual methods, and the resulting dispersion was diluted with deionized water to achieve a solids content of 20%, thus obtaining an aqueous primer No. 1B.

Production of Hydroxy Group-Containing Acrylic Emulsion (c)

144.5 parts of deionized water and 12 parts of Newcol 562SF (produced by Nippon Nyukazai Co., Ltd., trade name, ammonium polyoxyethylene alkylbenzene sulfonate, active ingredient: 60%) were placed in a reactor equipped with a stirrer, a reflux condenser, and a thermometer, mixed by stirring in a nitrogen stream, and heated to 80° C. Subsequently, an emulsion (I) comprising 56.2 parts of cyclohexyl methacrylate, 20 parts of n-butyl acrylate, 21 parts of 2-hydroxyethyl acrylate, 2.8 parts of acrylic acid, 1.75 parts of Newcol 707SF (produced by Nippon Nyukazai Co., Ltd., trade name, surfactant, active ingredient: 30%), and 94.3 parts of deionized water was prepared. 1% of the total amount of the emulsion (I) and 5.2 parts of a 3% ammonium persulfate aqueous solution were introduced into the reaction vessel and maintained at 80° C. for 15 minutes. The remaining monomer emulsion (I) was then added dropwise over a period of 3 hours to the reactor. After completion of the dropwise addition, the resulting mixture was aged for 1 hour. A hydroxy-containing acrylic emulsion (c) with an average particle size of 100 nm, an acid value of 22 mg KOH/g, a hydroxy value of 101 mg KOH/g, and a weight average molecular weight of about 200,000 was thus obtained.

Production of Hydroxy-Containing Acrylic Resin Solution (d)

40 parts of propylene glycol monomethyl ether was placed in a reactor equipped with a stirrer, a reflux condenser, and a thermometer. While the resulting mixture was heated and maintained at 120° C., a mixture of 53 parts of cyclohexyl methacrylate, 20 parts of n-butyl acrylate, 21 parts of 2-hydroxyethyl acrylate, 6 parts of acrylic acid, and 5 parts of azobisisobutyronitrile was added dropwise over a period of 3 hours. After the dropwise addition, the resulting mixture was aged at the same temperature for 1 hour. After a liquid mixture of 1 part of azobisdimethylvarelonitrile and 10 parts of propylene glycol monomethyl ether was added dropwise over a period of 1 hour, the resulting mixture was further aged for 1 hour. Then, 7.4 parts of dimethylethanolamine and 193 parts of deionized water were added with stirring. A hydroxy-containing acrylic resin solution (d) with an acid value of 47 mg KOH/g, a hydroxy value of 101 mg KOH/g, and a weight average molecular weight of about 10,000 was thus obtained.

Production of Polyester Resin (e)

273 parts of trimethylolpropane, 200 parts of succinic anhydride, and 490 parts of Cardura E10P (produced by Japan Epoxy Resin Co., Ltd., neodecanoic acid monoglycidyl ester) were placed in a reactor equipped with a stirrer, a reflux condenser, a water separator, and a thermometer; and allowed to react at 100 to 230° C. for 3 hours (when sampling was performed at this time, the reaction mixture had a hydroxy value of 350 mg KOH/g and a number average molecular weight of 580). Then, 192 parts of trimellitic anhydride was further added, and a condensation reaction was allowed to proceed at 180° C. A polyester resin (e) with an acid value of 49 mg KOH/g, a hydroxy value of 195 mg KOH/g, and a number average molecular weight of 1500 was thus obtained.

Examples 121B to 139B and Comparative Examples 19B to 21B

Aqueous primer coating compositions Nos. 2B to 23B were obtained in the same manner as in Example 120B, except that the formulations shown in Tables 15 and 16 below were used.

MICRO ACE P-4 in Tables 15 and 16 is fine-powder talc (average particle size: about 4.5 μm, produced by Nippon Talc Co., Ltd.).

Aqueous primer coating compositions Nos. 21B to 23B are for use in Comparative Examples.

The aqueous primer coating compositions Nos. 1B to 23B obtained in Examples 120B to 139B and Comparative Examples 19B to 21B were subjected to the following evaluation tests. Tables 15 and 16 below include the evaluation results.

Test plates were prepared in the following manner, and finished appearance (smoothness and distinctness of image) and water resistance were evaluated as described below.

Preparation of Test Plates

The aqueous primer coating compositions were air-sprayed over polypropylene plates (degreased) to a film thickness of 10 μm, and preheated at 80° C. for 3 minutes. As a base coating composition, WBC-713T No. 1F7 (produced by Kansai Paint Co., Ltd., trade name, an aqueous base coat composition) was electrostatically applied to the primer coating film to a film thickness of 15 μm, and preheated at 80° C. for 3 minutes. Subsequently, as a clear coating composition, Soflex #520 Clear (produced by Kansai Paint Co., Ltd., trade name, an acrylic-urethane based solvent clear coating composition) was electrostatically applied to a film thickness of 30 μm, and heated at 120° C. for 30 minutes to simultaneously cure the primer coating film, base coating film, and clear coating layer, thus obtaining test plates.

The finished appearance (smoothness and distinctness of image) was evaluated in the same manner as above for Examples 21B to 40B and Comparative Examples 4B to 6B.

Water Resistance

Each test plate was immersed in warm water at 40° C. for 240 hours. Immediately after the test plate was removed from the water, the coated surface was wiped dry, and the state of the coated surface was checked with the naked eye. An adhesion test was performed in the following manner within 15 minutes after removing the test plate from water. Cross-cuts reaching the substrate were made in the multilayer coating film of the test plate using a utility knife to form a grid of 100 squares (2 mm×2 mm). Subsequently, adhesive cellophane tape was applied to the surface of the grid portion, and the tape was peeled off rapidly at 20° C. Then, the number of squares of the coating film remaining and the condition of the coating film were checked.

Water resistance was evaluated according to the following criteria.

A: 100 squares of the coating film remained, and no blisters were observed.
B: 99 squares or less of the coating film remained, and no blisters were observed.
C: 99 squares or less of the coating film remained, and blisters were observed.

TABLE 15

| | | | Examples | | | | | | | | | | |
|---|---|---|---|---|---|---|---|---|---|---|---|---|---|
| | | | 120B | 121B | 122B | 123B | 124B | 125B | 126B | 127B | 128B | 129B | 130B |
| Aqueous primer coating No. | | | 1B | 2B | 3B | 4B | 5B | 6B | 7B | 8B | 9B | 10B | 11B |
| Reactive group-containing resin (B) | Aqueous chlorinated polypropylene | | 30 | 30 | 30 | 30 | 30 | 30 | 30 | 30 | 30 | 30 | 30 |
| | Hydroxy-containing acrylic emulsion (a) | | 5 | 5 | 5 | 5 | 5 | 5 | 5 | 5 | 5 | 5 | 5 |
| | Hydroxy-containing acrylic resin solution (b) | | 15 | 15 | 15 | 15 | 15 | 15 | 15 | 15 | 15 | 15 | 15 |
| | Polyester resin (c) | | 10 | 10 | 10 | 10 | 10 | 10 | 10 | 10 | 10 | 10 | 10 |
| Crosslinking agent (C) | MFK-60X | | 10 | 10 | 10 | 10 | 10 | 10 | 10 | 10 | 10 | 10 | 10 |
| Urethane resin particles (A-) | No. | | 1 | 2 | 3 | 4 | 5 | 6 | 7 | 8 | 9 | 10 | 11 |
| | Amount | | 30 | 30 | 30 | 30 | 30 | 30 | 30 | 30 | 30 | 30 | 30 |
| Pigments | Coloring pigments | JR-806 | 100 | 100 | 100 | 100 | 100 | 100 | 100 | 100 | 100 | 100 | 100 |
| | | EC600J | 5 | 5 | 5 | 5 | 5 | 5 | 5 | 5 | 5 | 5 | 5 |
| | Extender pigments | MICRO ACE P-4 | | | | | | | | | | | |
| Smoothness | | | 8.9 | 8.4 | 7.8 | 9.1 | 8.4 | 8.6 | 7.4 | 8.3 | 9.2 | 7.8 | 7.7 |
| Distinctness of image | | Initial | 14.4 | 14.9 | 15.3 | 15.4 | 14.7 | 16.1 | 14.8 | 15.3 | 15.4 | 15.9 | 15.1 |
| | | After storage | 14.9 | 14.9 | 15.9 | 15.8 | 14.9 | 15.9 | 14.7 | 15.6 | 15.4 | 15.6 | 15.8 |
| Water resistance | | | A | A | A | A | A | A | A | A | A | A | A |

TABLE 16

| | | Examples | | | | | | | | | Comparative Example | | |
|---|---|---|---|---|---|---|---|---|---|---|---|---|---|
| | | 131B | 132B | 133B | 134B | 135B | 136B | 137B | 138B | 139B | 19B | 20B | 21B |
| Aqueous primer coating No. | | 12B | 13B | 14B | 15B | 16B | 17B | 18B | 19B | 20B | 21B | 22B | 23B |
| Reactive group-containing resin (B) | Aqueous chlorinated polypropylene | 30 | 30 | 30 | 30 | 30 | 30 | 30 | 30 | 30 | 30 | 30 | 30 |
| | Hydroxy-containing acrylic emulsion (a) | 5 | 5 | 5 | 5 | 5 | 5 | 5 | 5 | 5 | 5 | 5 | 5 |
| | Hydroxy-containing acrylic resin solution (b) | 15 | 15 | 15 | 15 | 15 | 15 | 15 | 15 | 15 | 15 | 15 | 15 |
| | Polyester resin (c) | 10 | 10 | 10 | 10 | 10 | 10 | 10 | 10 | 10 | 10 | 10 | 10 |
| Crosslinking agent (C) | MFK-60X | 10 | 10 | 10 | 10 | 10 | 10 | 10 | 10 | 10 | 10 | 10 | 10 |
| Urethane resin particles (A-) | No. | 12 | 13 | 14 | 15 | 16 | 17 | 18 | 1 | 1 | 19 | 20 | 21 |
| | Amount | 30 | 30 | 30 | 30 | 30 | 30 | 30 | 30 | 30 | 30 | 30 | 30 |
| Pigments | Coloring pigments JR-806 | 100 | 100 | 100 | 100 | 100 | 100 | 100 | 100 | 100 | 100 | 100 | 100 |
| | EC600J | 5 | 5 | 5 | 5 | 5 | 5 | 5 | 5 | 5 | 5 | 5 | 5 |
| | Extender pigments MICRO ACE P-4 | | | | | | | | 5 | 10 | | | |
| Smoothness | | 8.4 | 9.4 | 7.7 | 8.3 | 8.5 | 8.1 | 9.2 | 9.1 | 9.4 | 12.4 | 14.3 | 12.1 |
| Distinctness of image | Initial | 14.8 | 16.3 | 15.2 | 15.3 | 14.9 | 15.8 | 15.9 | 14.8 | 15.4 | 21.2 | 25.3 | 22.2 |
| | After storage | 14.7 | 16.5 | 15.9 | 16.4 | 15.8 | 14.7 | 16.5 | 14.9 | 15.5 | 48.3 | 55.2 | 35.2 |
| Water resistance | | A | A | A | A | A | A | A | A | A | B | C | C |

The invention claimed is:

1. A core-shell type urethane resin particle having a core-shell structure in which the core comprises a urethane resin obtained by using a polyol component comprising polyether polyol, and the shell comprises a urethane resin obtained by using a polyol component comprising polycarbonate polyol,
wherein the urethane resin of the shell has a number average molecular weight of 1000 to 20000.

2. The core-shell type urethane resin particle according to claim 1, wherein the polyether polyol is present in a proportion of 30 to 100 mass %, based on the total amount of the polyol component of the urethane resin of the core.

3. The core-shell type urethane resin particle according to claim 1, wherein the polycarbonate polyol comprises a compound represented by the formula:

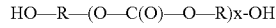
HO—R—(O—C(O)—O—R)x-OH wherein R is a $C_{1-12}$ alkylene group or a $C_{1-3}$ alkylene-$C_{3-8}$ cycloalkylene-$C_{1-3}$ alkylene group, x is an integer of 5 to 50, and each R may be the same or different.

4. A coating composition comprising the urethane resin particle according to claim 1.

5. The coating composition according to claim 4 comprising a film-forming resin component.

6. The coating composition according to claim 4, further comprising a reactive group-containing resin (B) and optionally comprising a crosslinking agent (C), the composition being an aqueous coating composition.

7. An article comprising a coating film of the coating composition according to claim 4.

8. A method for forming a coating film, comprising applying the coating composition according to claim 4.

9. A method for producing a core-shell type urethane resin particle, comprising the steps of:
reacting a monomer mixture comprising a polyol comprising polycarbonate polyol, and a polyisocyanate compound to obtain a urethane resin (II); and
reacting a monomer mixture comprising a polyol comprising polyether polyol, and a polyisocyanate compound in the presence of the urethane resin (II) to synthesize a urethane resin (I),
wherein the urethane resin (I) forms a core of the urethane resin particle and the urethane resin (II) forms a shell of the urethane resin particle.

* * * * *